United States Patent
Meixner et al.

(10) Patent No.: US 10,387,989 B2
(45) Date of Patent: *Aug. 20, 2019

(54) COMPILER TECHNIQUES FOR MAPPING PROGRAM CODE TO A HIGH PERFORMANCE, POWER EFFICIENT, PROGRAMMABLE IMAGE PROCESSING HARDWARE PLATFORM

(71) Applicant: Google LLC, Mountain View, CA (US)

(72) Inventors: Albert Meixner, Mountain View, CA (US); Hyunchul Park, Santa Clara, CA (US); William R. Mark, Mountain View, CA (US); Daniel Frederic Finchelstein, Redwood City, CA (US); Ofer Shacham, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/628,480

(22) Filed: Jun. 20, 2017

(65) Prior Publication Data

US 2017/0287103 A1 Oct. 5, 2017

Related U.S. Application Data

(63) Continuation of application No. 15/389,113, filed on Dec. 22, 2016.

(Continued)

(51) Int. Cl.
*G06F 8/41* (2018.01)
*G06F 9/50* (2006.01)
*G06T 1/20* (2006.01)

(52) U.S. Cl.
CPC ............... *G06T 1/20* (2013.01); *G06F 8/447* (2013.01); *G06F 9/5077* (2013.01)

(58) Field of Classification Search
CPC .......... G06T 1/20; G06F 8/447; G06F 9/5077
(Continued)

(56) References Cited

U.S. PATENT DOCUMENTS

| 4,445,177 A | 4/1984 | Bratt et al. |
| 4,935,894 A | 6/1990 | Ternes et al. |

(Continued)

FOREIGN PATENT DOCUMENTS

| CN | 105023289 | 11/2015 |
| EP | 0293701 | 12/1988 |

(Continued)

OTHER PUBLICATIONS

Chao et al., "Pyramid Architecture for 3840 × 2160 Quad Full High Definition 30 Frames/s Video Acquisition," IEEE Transactions on Circuits and Systems for Video Technology (Nov. 1, 2010).*

(Continued)

*Primary Examiner* — Duy Khoung T Nguyen
*Assistant Examiner* — Theodore E Hebert
(74) *Attorney, Agent, or Firm* — Fish & Richardson P.C.

(57) ABSTRACT

Methods, systems, and apparatus, including computer programs encoded on computer storage media, for restructuring an image processing pipeline. The method includes compiling program code targeted for an image processor having programmable stencil processors composed of respective two-dimensional execution lane and shift register circuit structures. The program code is to implement a directed acyclic graph and is composed of multiple kernels that are to execute on respective ones of the stencil processors, wherein the compiling includes performing any of: horizontal fusion of kernels; vertical fusion of kernels; fission of one of the kernels into multiple kernels; spatial partitioning of a kernel into multiple spatially partitioned kernels; or splitting the directed acyclic graph into smaller graphs.

9 Claims, 41 Drawing Sheets

Related U.S. Application Data

(60) Provisional application No. 62/300,684, filed on Feb. 26, 2016.

(58) Field of Classification Search
USPC .......................................................... 717/140
See application file for complete search history.

(56) References Cited

U.S. PATENT DOCUMENTS

| | | | |
|---|---|---|---|
| 5,253,308 A | 10/1993 | Johnson | |
| 5,612,693 A | 3/1997 | Craft et al. | |
| 5,751,864 A | 5/1998 | Moriwake et al. | |
| 5,892,962 A | 4/1999 | Cloutier | |
| 6,049,859 A | 4/2000 | Gliese et al. | |
| 6,366,289 B1 | 4/2002 | Johns | |
| 6,587,158 B1 | 7/2003 | Dale et al. | |
| 6,728,862 B1 | 4/2004 | Wilson | |
| 6,745,319 B1 | 6/2004 | Balmer et al. | |
| 6,970,196 B1 | 11/2005 | Masatoshi et al. | |
| 7,010,177 B1 | 3/2006 | Mattison | |
| 7,167,890 B2 | 1/2007 | Lin et al. | |
| 7,200,287 B2 | 4/2007 | Fukuda et al. | |
| 7,286,717 B2 | 10/2007 | Nomizu | |
| 7,583,851 B2 | 9/2009 | Kudo et al. | |
| 7,941,634 B2* | 5/2011 | Georgi | G06T 1/60 712/10 |
| 156,284 A1 | 4/2012 | Vorbach et al. | |
| 8,321,849 B2 | 11/2012 | Nickolls et al. | |
| 8,436,857 B2 | 5/2013 | Twilleaqer | |
| 8,508,612 B2 | 8/2013 | Cote et al. | |
| 8,543,843 B1 | 9/2013 | Chenq et al. | |
| 8,578,389 B1* | 11/2013 | Boucher | G06F 9/4494 718/106 |
| 8,650,384 B2* | 2/2014 | Lee | G06F 9/5038 712/203 |
| 8,749,667 B2 | 6/2014 | Noraz et al. | |
| 8,786,614 B2* | 7/2014 | Curry | G06T 1/20 345/501 |
| 8,797,323 B2* | 8/2014 | Salvi | G06T 15/08 345/426 |
| 8,823,736 B2* | 9/2014 | Barringer | G06T 11/40 345/418 |
| 8,970,884 B2 | 3/2015 | Tsuji et al. | |
| 8,976,195 B1 | 3/2015 | Lindholm et al. | |
| 2005/0270412 A1 | 12/2005 | Kaman et al. | |
| 2006/0044576 A1 | 3/2006 | Tabata et al. | |
| 2007/0003161 A1* | 1/2007 | Liao | G06F 8/456 382/276 |
| 2007/0047828 A1 | 3/2007 | Ishii et al. | |
| 2007/0080969 A1 | 4/2007 | Yamaura | |
| 2007/0156729 A1 | 7/2007 | Shaylor | |
| 2008/0111823 A1 | 5/2008 | Fan et al. | |
| 2008/0244222 A1 | 10/2008 | Supalov et al. | |
| 2009/0002390 A1 | 1/2009 | Kuna | |
| 2009/0190837 A1* | 7/2009 | Forutanpour | G06K 9/4609 382/203 |
| 2009/0228677 A1 | 9/2009 | Lieqe | |
| 2009/0300621 A1* | 12/2009 | Mantor | G06F 9/30087 718/100 |
| 2009/0317009 A1 | 12/2009 | Ren | |
| 2010/0122105 A1 | 5/2010 | Arslan et al. | |
| 2010/0188538 A1 | 7/2010 | Suqawa et al. | |
| 2011/0022817 A1* | 1/2011 | Gaster | G06F 9/52 711/202 |
| 2011/0055495 A1 | 3/2011 | Wolford et al. | |
| 2011/0087867 A1 | 4/2011 | Jacobson et al. | |
| 2011/0125768 A1 | 5/2011 | Shibao | |
| 2011/0153925 A1 | 6/2011 | Bains et al. | |
| 2012/0320070 A1 | 12/2012 | Arva | |
| 2013/0027416 A1 | 1/2013 | Vaithianathan et al. | |
| 2013/0091507 A1* | 4/2013 | Wu | G06F 9/5038 718/104 |
| 2013/0202051 A1 | 8/2013 | Zhou | |
| 2013/0243329 A1 | 9/2013 | Oro Garcia et al. | |
| 2013/0314428 A1 | 11/2013 | Chen et al. | |
| 2013/0318544 A1 | 11/2013 | Kuroda et al. | |
| 2014/0028876 A1 | 1/2014 | Mills | |
| 2014/0136816 A1 | 5/2014 | Krig | |
| 2014/0204232 A1* | 7/2014 | Wang | H04N 9/04 348/222.1 |
| 2014/0282611 A1 | 9/2014 | Campbell et al. | |
| 2015/0106596 A1 | 4/2015 | Vorbach et al. | |
| 2016/0210720 A1* | 7/2016 | Taylor | G06T 1/20 |
| 2016/0219225 A1 | 7/2016 | Zhu et al. | |
| 2016/0313980 A1 | 10/2016 | Meixner et al. | |
| 2016/0313984 A1 | 10/2016 | Meixner et al. | |
| 2016/0313999 A1 | 10/2016 | Meixner et al. | |
| 2016/0314555 A1 | 10/2016 | Zhu et al. | |
| 2016/0316094 A1 | 10/2016 | Meixner et al. | |
| 2016/0316107 A1 | 10/2016 | Shacham et al. | |
| 2016/0316157 A1 | 10/2016 | Desai et al. | |
| 2017/0249716 A1* | 8/2017 | Meixner | G06T 1/20 |
| 2017/0287103 A1* | 10/2017 | Meixner | G06T 1/20 |

FOREIGN PATENT DOCUMENTS

| | | |
|---|---|---|
| JP | 2013090070 | 5/2013 |
| TW | 201032129 | 9/2010 |
| TW | 201203106 | 1/2012 |
| TW | 201602905 | 1/2016 |
| WO | WO 9409595 | 4/1994 |
| WO | WO 2007/071883 | 6/2007 |

OTHER PUBLICATIONS

"ChimeraTM: The NVIDIA Computational Photography Architecture" Whitepaper, NVIDIA. Corporation 2013, 15 pages.

"Multioutput. Scaler Reference Design" Altera Coiporation, Application Note AN-648-1.0, Aug. 2012, 18 pages.

Adams, et al. "The Frankencamera: An Experimental Platform for Computational Photography" ACM Transactions on Graphics:, vol. 29, No. 4, Article 29, Publication Jul. 2010, 12 pages.

Ahn, et al., "Evaluating the Image Stream Architecture," In ACM SIGARCH Computer Architecture News, vol. 32, No. 2, IEEE Computer Society, Jun. 2004, 14 pages.

Arasan "Silicon Hive Announces New Image Signal Processor", Eindhoven, the Netherlands, May 16, 2006, http://www.design-reuse.com/news/13362/silicon-hive-image-singal-processor.html, 3 pages.

Balfour, et al. "An Energy-Efficient Processor Architecture for Embedded Systems" IEEE Computer Architecture Letters 7, No. 1 p. 29-32, May 2008.

Barry, et al., "Always-on Vision Processing Unit for Mobile Applications", IEEE Micro, Mar./Apr. 2015, pp. 56-66.

Bolotoff, Paul V., "Alpha—The History in Facts and Comments" http://alasir.com/articles/alpha_historyalpha_21164_21164pc.html, Last modification date Apr. 22, 2007, 5 pages.

Brunhaver, John S. "Design and Optimization of a Stencil Engine", Stanford University, Jun. 2015, 133 pages.

Bushey, et al., "Flexible Function-Level Acceleration of Embedded Vision Applications Using the Pipelined Vision Processor." In Signals, Systems and Computers, 2013 Asilomar Conference, pp. 1447-1452, IEEE, 2013.

Cardells-Tormo et al., "Area-efficient 2-D Shift-variant Convolvers for FPGA-based Digital Image Processing," IEEE. Workshop on Signal Processing Systems Design and Implementation, Nov. 2, 2005, 5 pages.

CEVA-MM3101: An Imaging—Optimized DSP Core Swings for an Embedded Vision Home Run, http://www.bdti.com/InsideDSP/2012/101/24/CEVA, Jan. 19, 2012, 3 pages.

Chao et al., "Pyramid Architecture for 3840 – 2160 Quad Full High Definition 30 Frames/s Video Acquisition," IEEE Transactions on Circuits and Systems for Video Technology, Nov. 1, 2010, 10 pages.

Chen et al., "CRISP: Coarse-Grained Reconfigurable Image Stream Processor for Digital Still Cameras and Camcorders," IEEE Transactions on Circuits and Systems for Video Technology, Sep. 2008, 14 pages.

(56) References Cited

OTHER PUBLICATIONS

Chen. et al., "DaDianNao: A Machine-Learning; Supercomputer." 47m Annual 11-EE/ACM International Symposium, pp. 609-622, IEEE, Dec. 2014.
Chenyun, et al., "A Paradigm Shift in Local Interconnect Technology Design in the Era of Nanoscale Multigate and Gate-All-Around Devices," IEEE Electron Device Letters, vol. 36, No. 3, pp. 274-226, Mar. 2015.
Clearspeed Whitepaper: CSX Processor Architecture, www.clearspeed.com, 2007, 16 pages.
Codrescu, et al., "Hexagon DSP: An Architecture Optimized for Mobile Multimedia and Communications." IEEE Micro vol. 34, Issue 2, pp. 34-43, Mar. 2014.
Dally, William J., "Computer architecture is all about interconnect." Proceedings of 8th International Symposium High-Perf. Comp. Architecture, Feb. 2002, 11 pages.
de Dinechin, et al, "A Clustered Manycore Processor Architecture for Embedded and Accelerated Applications." In High Performance Extreme Computing Conference (HPEC), IEEE, pp. 1-6, Sep. 2013.
DeVito, et al, "Terra: A Multi-Stage Language for High-Performance Computing", PLDI'13, Jun. 16-22, 2013. Seattle, Washington, 11 pages.
DeVito, et al.,"First-class Runtime Generation of High-Performance Types using Exotypes", PLDI'14, Jun. 9-11, ACM, 12 pages.
Dykes et al., "Communication and Computation Patterns of Large Scale Image Convolutions on Parallel Architectures," Parallel Processing Symposium, Jan. 1, 1994, 6 pages.
Eichenberger, et al., "Optimizing Compiler for the Cell Processor" PACT, Tuesday, Sep. 20th, 2005, Part 1, pp. 1-16.
Eichenberger, et al., "Optimizing Compiler for the Cell Processor" PACT, Tuesday, Sep. 20th, 2005, Part 2, pp. 17-32.
EyeQ2TM, "Vision System on a Chip". Moblileye, Sep. 2007, 4 pages.
Farabet, et al., "Hardware Accelerated Convolutional Neural Networks for Synthetic Vision Systems." Proceedings of 2010 IEEE International Symposium, pp. 257-260, Jun. 2010.
Farabet, et al., "Neuflow: A Runtime Reconfigurable Dataflow Processor for Vision." IEEE Computer Society Conference, pp. 109-116, Jun. 2011.
Galal, et al., "FPU Generator for Design Space Exploration." 21st IEEE Symposium on Computer Arithmetic (ARITH), Apr. 2013, 10 pages.
Gentile et al., "Image Processing Chain for Digital Still Cameras Based on SIMPil Architecture." ICCP International Conference Workshops, pp. 215-222, IEEE, Jun. 2005.
Goldstein, et at. "PipeRench: A Coprocessor for Streaming Multimedia Acceleration", Carnegie Mellow University, Research Showcase @CMU, Appears in the 26th Animal International Symposium on Computer Architecture, May 1999, Atlanta, Georgia, 14 pages.
Gupta, et al., "A VLSI Architecture for Updating Raster-Scan Displays", Computer Graphics, vol. 15, No. 3, Aug. 1981, pp. 71-78.
Hameed, et al., "Understanding Sources of Inefficiency in General-Purpose Chips." ACM SIGARCH Computer Architecture News, vol. 38, No. 3, pp. 37-47, 2010.
Haurahan, Pat, "Domain-Specific Languages for Heterogeneous GPU Computing", NVIDIA Technology Conference, Oct. 2, 2009, 30 pages.
Hegarty, et al., "Darkroom: Compiling High-Level Image Processing Code into Hardware Pipelines", Proceedings of ACM SIG-GRAPH, Jul. 2014, 11 pages.
Henretty, et al., "A Stencil Compiler for Short-Vector SIMD Architectures", ACM, ICS'13, Jun. 10-14, 2013. Eugene, Oregon, pp. 13-24.
Horowitz, Mark, "Computing's EnergyProblem: (and what we can do about it)", IEEE, International Solid-State Circuits Conference 2014, 46 pages.
Kapasi, et al, "The Imagine Stream Processor", IEEE. International Conference on Computer Design: VLSI in Computers and Processors (ICCD'02), 2002, 17 pages.
Khailany, et al., "A Programmable 512 GOPS Stream Processor for Signal, Image, and Video Processing", IEEE Journal of Solid-State Circuits. vol. 43, No. 1, pp. 202-213. Jan. 2008.
Khawam, et al., "The Reconfigurable Instruction Cell Array", IEEE Transactions on Very Large Scale Integration (VLSI) Systems, vol. 16, No. 1, Jan. 2008, pp. 75-85.
Khronos, SPIR 2.0 "Provisional Specification to Enable Compiler Innovation on Diverse Parallel Architectures", Aug. 11, 2014, 2 pages.
Levinthal, "Parallel Computers for Graphics Applications", ACM, 1987, pp. 193-198.
Levinthal, et al,, "Chap-A SIMD Graphics Processor", Computer Graphics, vol. 18, No. 3, Jul. 1984, pp. 77-82.
M.J. Duff, "CLIP 4: A Large Scale Integrated Circuit Array Parallel Processor," Proc. IEEE Int'l Joint Conf. Pattern Recognition, . . . Jan. 2004, pp. 728-733.
Mandal, et al., "An Embedded Vision Engine (EVE) for Automotive Vision Processing." In Circuits and Systems (ISCAS), 2014 IEEE Symposium, pp. 49-52, IEEE, 2014.
Mcintosh-Smith. "A Next-Generation Many-Core Processor With Reliability, Fault Tolerance and Adaptive Power Management Features Optimized for Embedded and High Performance Computing Applications" in Proceedings of the High Performance Embedded Computing Conference (HPEC) 2008, pp. 1-2, 5.
Mody, et al., "High Performance and Flexible Imaging Sub-Svstem" In Advances in Computing, Communications and Informatics (ICACCI), 2014 International Conference, pp. 545-548. IEEE, 2014.
Molnar, et al., "PixelFlow: High-Speed Rendering Using Image Composition" proceedings of Siggraph 92, Computer Graphics, 26, Jul. 2, 1992, 10 pages.
Moloney, David, "1 TOPS/W Software Programmable Media Processor." Hot Chips 23 Symposium (HCS), IEEE, Aug. 2011, 24 pages.
Moloney, et al., "Myriad 2: Eye of the Computational Vision Storm", Hot Chips 26 Symposium (HCS), IEEE, Aug. 2014, 18 pages.
MPPA—MANYCORE, Product Family Overview http://www.kalray.eu/IMG/pdf/FLYER_MPPA_MANYCORE-4.pdf, Feb. 2014, 2 pages.
Nightingale, Edmund B., et al.. "Helios: Heterogeneous Multiprocessing with Satellite Kernels," SOSP '09, Oct. 11-14, 2009, Big Sky, Montana, U.S.A., (Oct. 11, 2009), 14 pages.
NVIDIA-NVIDLA's Next Generation CUDA™ Compute Architecture: Kepler™, GK110/210, 2014, 23 pages, http://international.download.nvidia.com/pdf/kepler/NVIDIA-Kepler-GK110-GK210-Architecture-Whitepaper.pdf.
NVIDIA Tegra K1—A New Era in Mobile Computing—Whitepapers—Jan. 2014, 26 pages.
NVIDIA Tega X1—NVIDLA'S New Mobile Superchip—Whitepapers—Jan. 2015, 41 pages.
NVIDIA, "PTX:Parallel Thread Execution ISA Version I.4", Aug. 23, 2010, 135 pages.
Olofsson, et al., "A 25 GFLOPS/Watt ftwa Sore Programmable Floating Point Accelerator" High Performance Embedded Computing Conference, 2010, 2 pages.
Oosterhout, Optimized Pixel Template Image Correlator, Master Thesis, Aug. 19. 1992, 74 pages.
Parker, Richard, "Embedding Computer Vision in Electronic Devices: How New Hardware and Software Choices Have Changed the Designer's Approach", Future Technology Magazine, pp. 22-23, Feb. 2013.
PCT/US2016/068932—International Search Report and Written Opinion, dated Mar. 23, 2017, 13 pages.
Pelc, Oscar, "Multimedia Support in the i.MX31 and i.MX31 L Applications Processors", Freescale Semiconductor, Inc., Feb. 2006, http://cache.freescale.com/files/32bit/doc/white_paper/IMX31MULTIWP.pdf, 12 pages.
Pham, et al., "NeuFlow: Dataflow Vision Processing System-on-a-Chip." IEEE 55m International Midwest Symposium, Aug. 2012, 4 pages.
Qadeer, et al., "Convolution Engine: Balancing Efficiency & Flexibility in Specialized Computing", ISCA '13 Tel-Aviv, Israel, ACM 2013, pp. 24-35.

(56) References Cited

OTHER PUBLICATIONS

Ragan-Kelley et al., "Halide: A Language and Compiler for Optimizing Parallelism, Locality, and Recomputation in Image Processing Pipelines," Jun. 16, 2013, 12 pages.
S.F. Reddaway,"DAP—A Distributed Processor Array", ISCA '73 Proceedings of the First Ann. Symposium on Computer Architecture, pp. 61-65.
Saidan, T. et al. "parallelization Scheme for Memory Optimization on the Cell Processor: A Case Study on the Harris Corner Detector," Network and Parallel Computing, 2011, pp. 177-200.
SCP2200: Image Cognition Processors Family [Product Briet]*, https://www.element14.com/community/docs/DOC-50990, Oct. 26, 2012, 2 pages.
SCP2200: Image Cognition Processors*, https://www.element14.com/community/docs/DOC-50984/I/scp2200-image-cognition-processors, Oct. 25, 2012, 2 pages.
Sedaghati, et al., "SIVEC: A Vector Instruction Extension for High Performance Stencil Computation," Parallel Architectures and Compilation Techniques, Oct. 10, 2011, 12 pages.
SemiWiki.com—New CEVA-ZM14 Vision IP Does Point clouds and and More: Published Feb. 27, 2015, https://www.semiwiki.com/forum/content/4354-new-ceva-xm4-vision-ip-does-point-clouds-more.html.
Shacham, et al. "Smart Memories Polymorphic Chip Multiprocessor", Proceedings of the 46th Design Automation Conference (OAC), San Francisco, CA, Jul. 2009.
Shacham, et al., "Rethinking Digital Design: Why Design Must Change", IEEE micro Magazine, Nov./Dec. 2010.
Shacham, Ofer, "Chip Multiprocessor Generator: Automatic Generation of Custom and Heterogeneous Complete Platforms" Dissertation—Stanford University, May 2011, 190 pages. Part 1.
Shacham, Ofer, "Chip Multiprocessor Generator: Automatic Generation of Custom and Heterogeneous Complete Platforms" Dissertation—Stanford University, May 2011, 190 pages. Part 2.
Silicon Hive: "Silicon System Design of Media and Communications Applications", Jun. 13, 2007, 22 pages.
Spampinato, et al., "A Basic Linear Algebra. Compiler", ACM, CG0'14, Feb. 15-19, 2014, Orlando FL, pp. 23-32.
SPIR, The SPIR Specification, Version 2.0, Revision Date Jun. 5, 2014, 40 pages.
Stein, et al., "A Computer Vision System on a Chip: A Case Study From the Automotive Domain." IEEE Computer Society Conference, p. 130, 2005.
Stojanov, et al., "Abstracting Vector Architectures in Library Generators: Case Study Convolution Filters", ARRAY 14. ACM, Jun. 11, 2014, UK, pp. 14-19.
Stream Processors, Inc. Announces Storm-1 Family of Data-Parallel Digital Signal Processors, ISSCC 2007, Feb. 12, 2007, 3 pages. http:/www.businesswire.comnews/home/20070212005230/en/Stream-Processors-Announces-Storm-1-Family-Data-Parallel-Digital.
Stream Processors, Inc., Company History—Foundational Work in Stream Processing initiated in 1995. https://en.wikipedia.org/wiki/Stream_Processors,_inc, 5 pages.
Tanabe, et al., "Visconti: multi-VLIW image Recognition Processor Based on Configurable Processor [obstacle detection applications],", Custom Integrated Circuits Conference, IEEE, 2003, http://ieeexplore.ieee.org/document/1249387/?arnumber=1249387&tag=1.
Van der Wal, et al., "The Acadia Vision Processor", IEEE proceedings of International Workshop on Computer Applications for Machine Perception, Sep. 2000, http://citeseerx.ist.pdu.edu/viewdoc/download?doi=10.1.1.32.3830&rep&type=pdf, 10 pages.
Wahib et al., "Scalable Kernel Fusion for Memory-Bound GPU Applications," SC14: International Conference for High Performance Computing, Networking, Storage and Analysis, Nov. 16, 2014, 12 pages.
Yu et al., "Optimizing Data Intensive Window-based Image Processing on reconfigurable Hardware Boards," Proc. IEEE Workshop on Signal Processing System Design and Implementation, Nov. 2, 2005, 6 pages.
Zhou, Minhua, et al., "Parallel Tools in HEVC for High-Throughput Processing," Applications of Digital Processing, XXXV, Proc. of SPI, vol. 8499, (Jan. 1, 2012), pp. 1-13.
KP Office Action in Korean Appln. 10-2018-7022160, dated Apr. 26, 2019, 15 pages.
Lutz et al, "Helium: A Transparent Inter-Kernel Optimizer for Open CL," Proceedings of the $8^{th}$ Workshop on General Purpose Processing Using GPUs, Feb. 6, 2015, 12 pages.

* cited by examiner

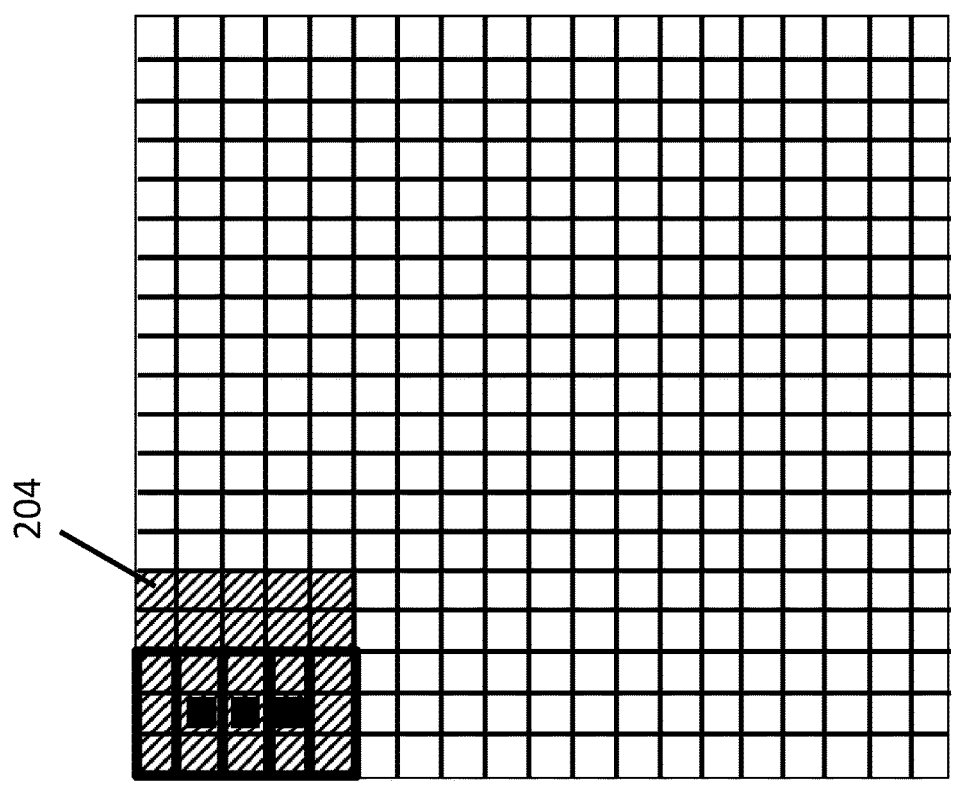

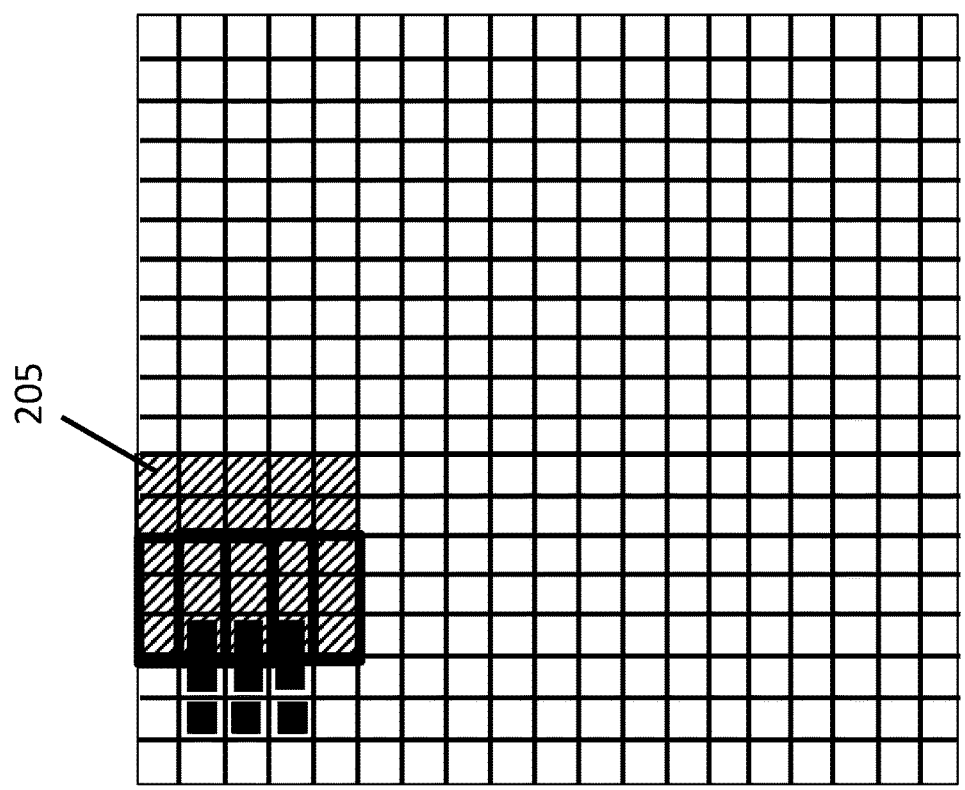

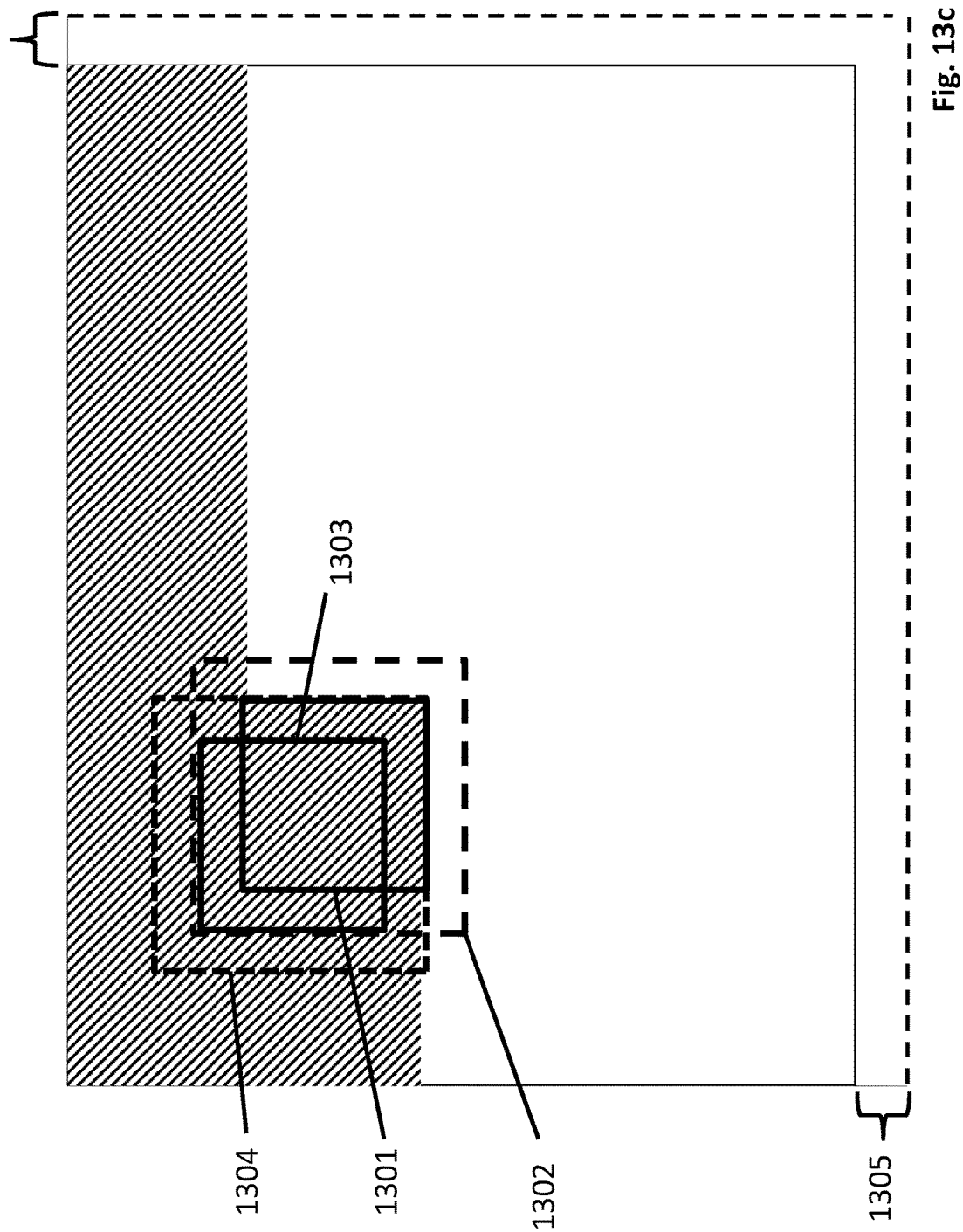

compiling program code targeted for an image processor having programmable stencil processors composed of respective two-dimensional execution lane and shift register circuit structures, the program code to implement a directed acyclic graph and being composed of multiple kernels that are to execute on respective ones of said stencil processors, wherein the compiling comprises any of:
    recognizing there are more kernels in the program code than stencil processors in the image processor;
    recognizing that at least one of the kernels is more computationally intensive than another one of the kernels;
    recognizing that the program code has resource requirements that exceed the image processor's memory capacity;

1701

in response to any of the recognizing above performing any of:
    horizontal fusion of kernels;
    vertical fusion of kernels;
    fission of one of the kernels into multiple kernels;
    spatial partitioning of a kernel into multiple spatially partitioned kernels;
    splitting the directed acyclic graph into smaller graphs.

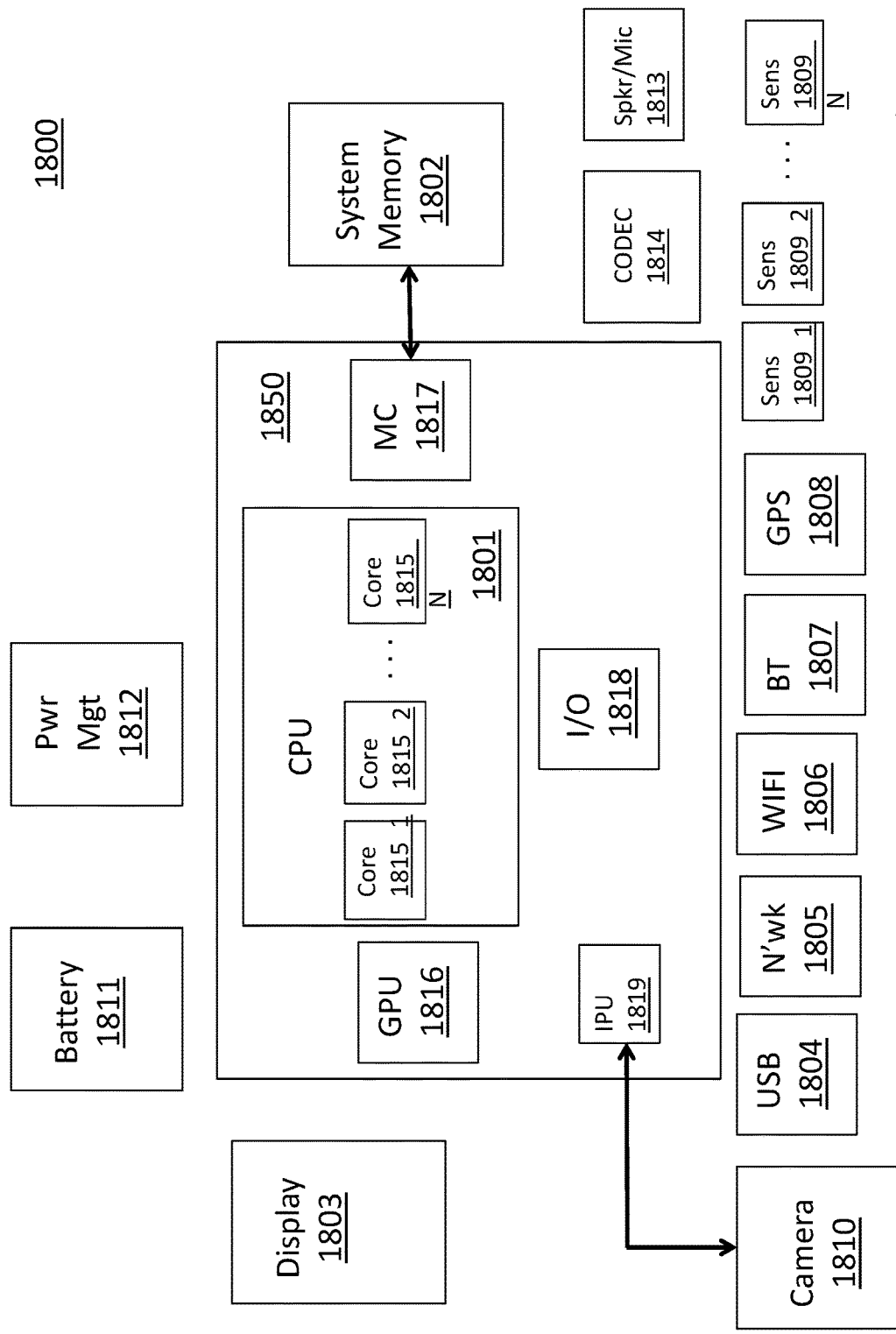

COMPILER TECHNIQUES FOR MAPPING PROGRAM CODE TO A HIGH PERFORMANCE, POWER EFFICIENT, PROGRAMMABLE IMAGE PROCESSING HARDWARE PLATFORM

CROSS-REFERENCE TO RELATED APPLICATIONS

This application is a continuation application of, and claims priority to pending U.S. application Ser. No. 15/389,113, filed on Dec. 22, 2016, which claims priority to U.S. Provisional Application No. 62/300,684, filed on Feb. 26, 2016. The entirety of the disclosures of the prior applications are herein incorporated by reference.

FIELD OF INVENTION

The field of invention pertains generally to image processing, and, more specifically, to compiler techniques for mapping program code to a programmable image processing hardware platform, such as a high performance, power efficient programmable image processing hardware platform.

BACKGROUND

Image processing typically involves the processing of pixel values that are organized into an array. Here, a spatially organized two dimensional array captures the two dimensional nature of images (additional dimensions may include time (e.g., a sequence of two dimensional images) and data type (e.g., colors). In a typical scenario, the arrayed pixel values are provided by a camera that has generated a still image or a sequence of frames to capture images of motion. Traditional image processors typically fall on either side of two extremes.

A first extreme performs image processing tasks as software programs executing on a general purpose processor or general purpose-like processor (e.g., a general purpose processor with vector instruction enhancements). Although the first extreme typically provides a highly versatile application software development platform, its use of finer grained data structures combined with the associated overhead (e.g., instruction fetch and decode, handling of on-chip and off-chip data, speculative execution) ultimately results in larger amounts of energy being consumed per unit of data during execution of the program code.

A second, opposite extreme applies fixed function hardwired circuitry to much larger blocks of data. The use of larger (as opposed to finer grained) blocks of data applied directly to custom designed circuits greatly reduces power consumption per unit of data. However, the use of custom designed fixed function circuitry generally results in a limited set of tasks that the processor is able to perform. As such, the widely versatile programming environment (that is associated with the first extreme) is lacking in the second extreme.

A technology platform that provides for both highly versatile application software development opportunities combined with improved power efficiency per unit of data remains a desirable yet missing solution.

SUMMARY

A method is described. The method includes compiling program code targeted for an image processor having programmable stencil processors composed of respective two-dimensional execution lane and shift register circuit structures. The program code is to implement a directed acyclic graph and is composed of multiple kernels that are to execute on respective ones of the stencil processors, wherein the compiling includes any of: recognizing there are a different number of kernels in the program code than stencil processors in the image processor; recognizing that at least one of the kernels is more computationally intensive than another one of the kernels; and, recognizing that the program code has resource requirements that exceed the image processor's memory capacity. The compiling further includes in response to any of the recognizing above performing any of: horizontal fusion of kernels; vertical fusion of kernels; fission of one of the kernels into multiple kernels; spatial partitioning of a kernel into multiple spatially partitioned kernels; splitting the directed acyclic graph into smaller graphs.

An apparatus is described. The apparatus includes means for compiling program code targeted for an image processor having programmable stencil processors composed of respective two-dimensional execution lane and shift register circuit structures. The program code is to implement a directed acyclic graph and is composed of multiple kernels that are to execute on respective ones of the stencil processors, wherein the means for compiling includes means for any of: recognizing there are a different number of kernels in the program code than stencil processors in the image processor; recognizing that at least one of the kernels is more computationally intensive than another one of the kernels; and, recognizing that the program code has resource requirements that exceed the image processor's memory capacity. The means for compiling further includes means for, in response to any of the recognizing above, performing any of: horizontal fusion of kernels; vertical fusion of kernels; fission of one of the kernels into multiple kernels; spatial partitioning of a kernel into multiple spatially partitioned kernels; splitting the directed acyclic graph into smaller graphs.

LIST OF FIGURES

The following description and accompanying drawings are used to illustrate embodiments of the invention. In the drawings:

FIGS. 2a, 2b, 2c, 2d and 2e depict the parsing of image data into a line group, the parsing of a line group into a sheet and the operation performed on a sheet with overlapping stencils;

Figure 8:
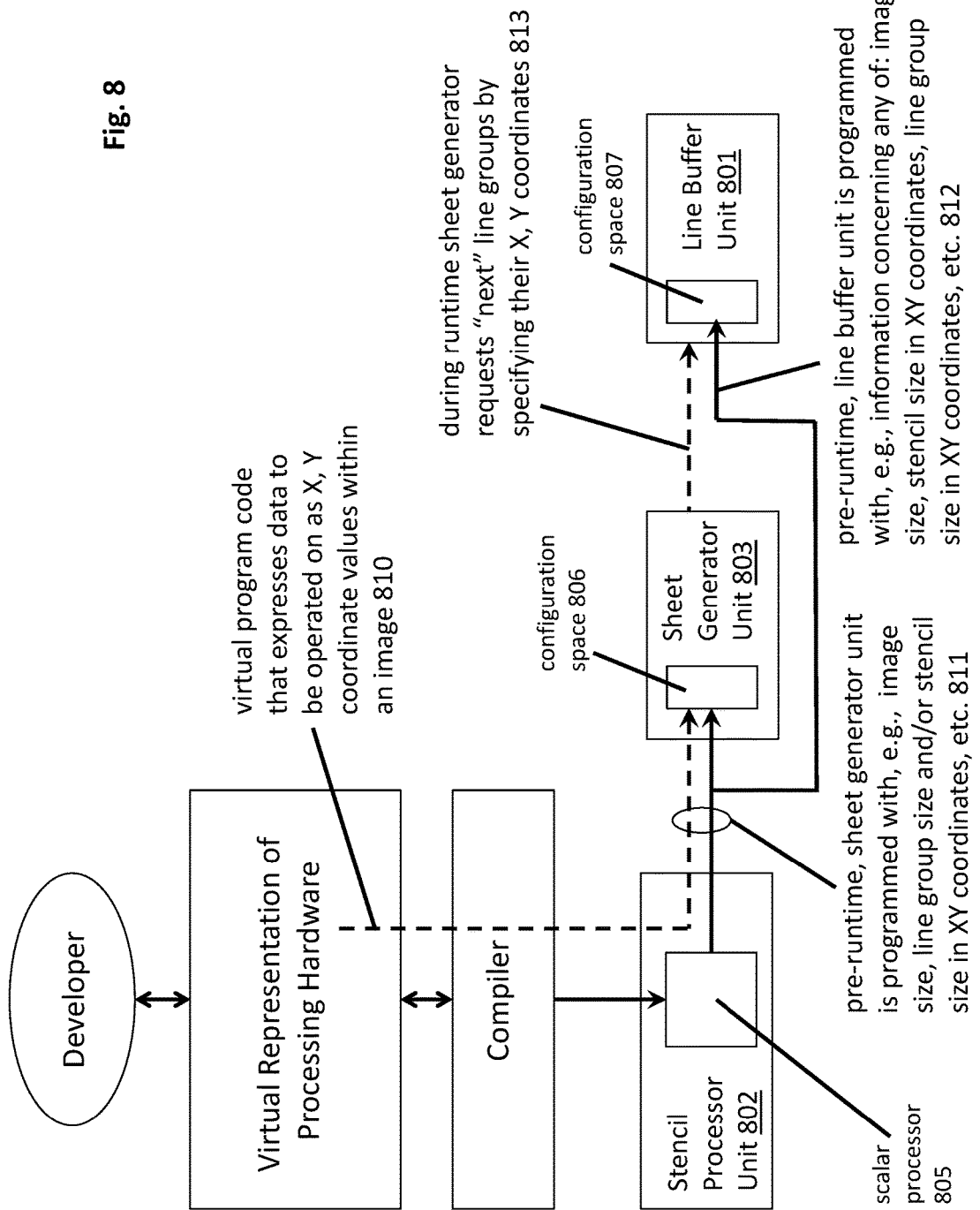
Figure 9A:
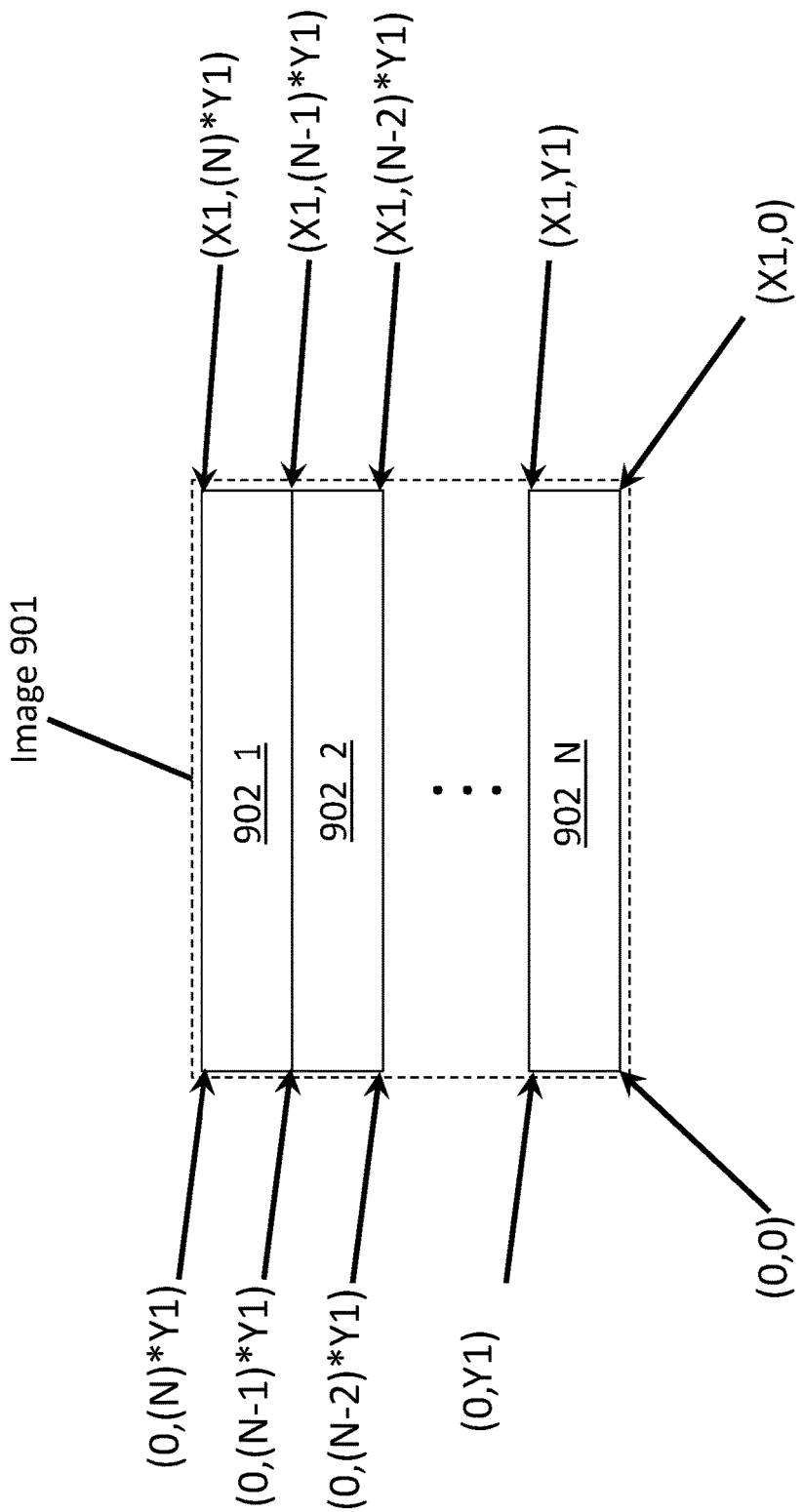
Figure 9B:
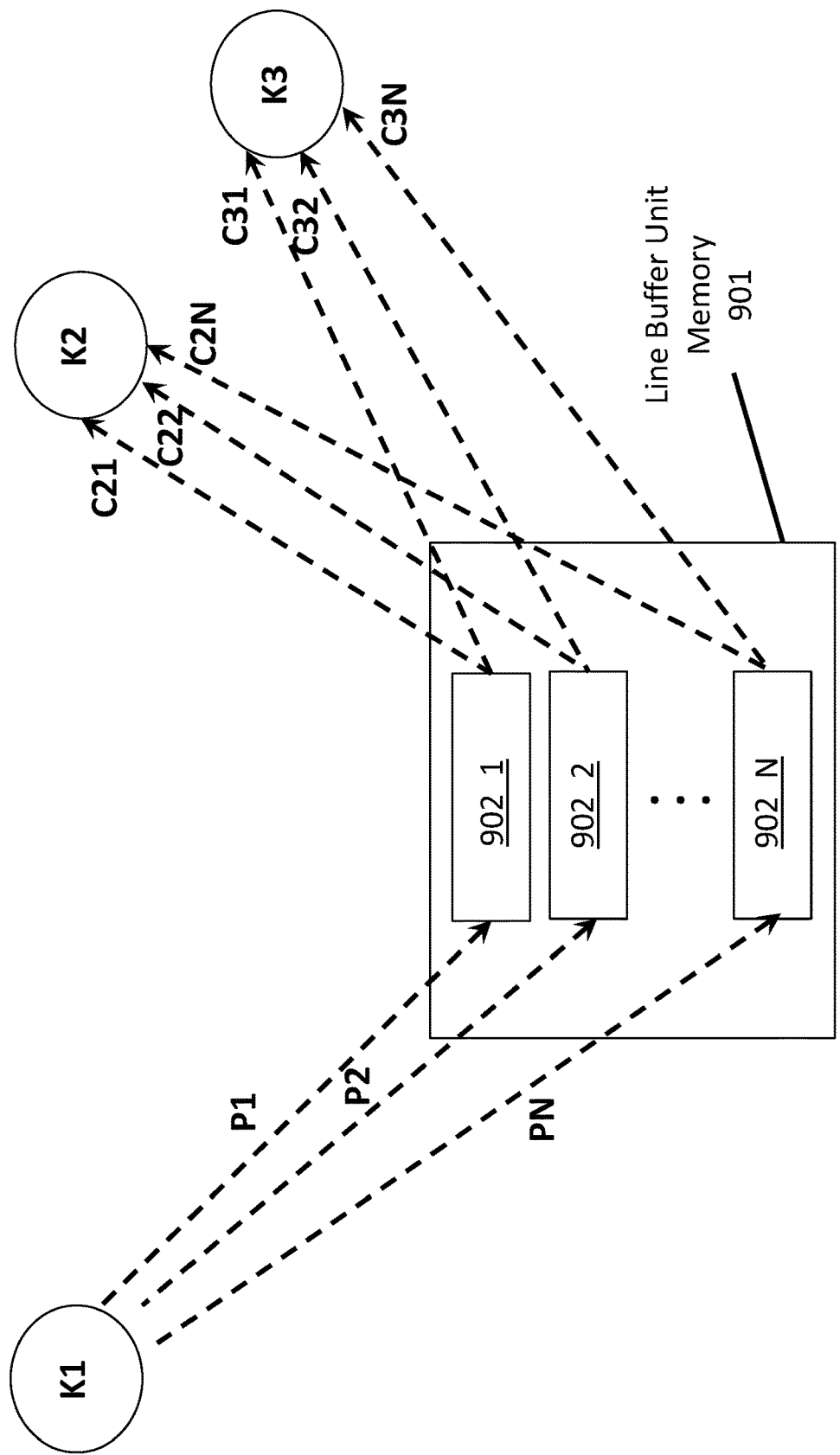
Figure 10A:
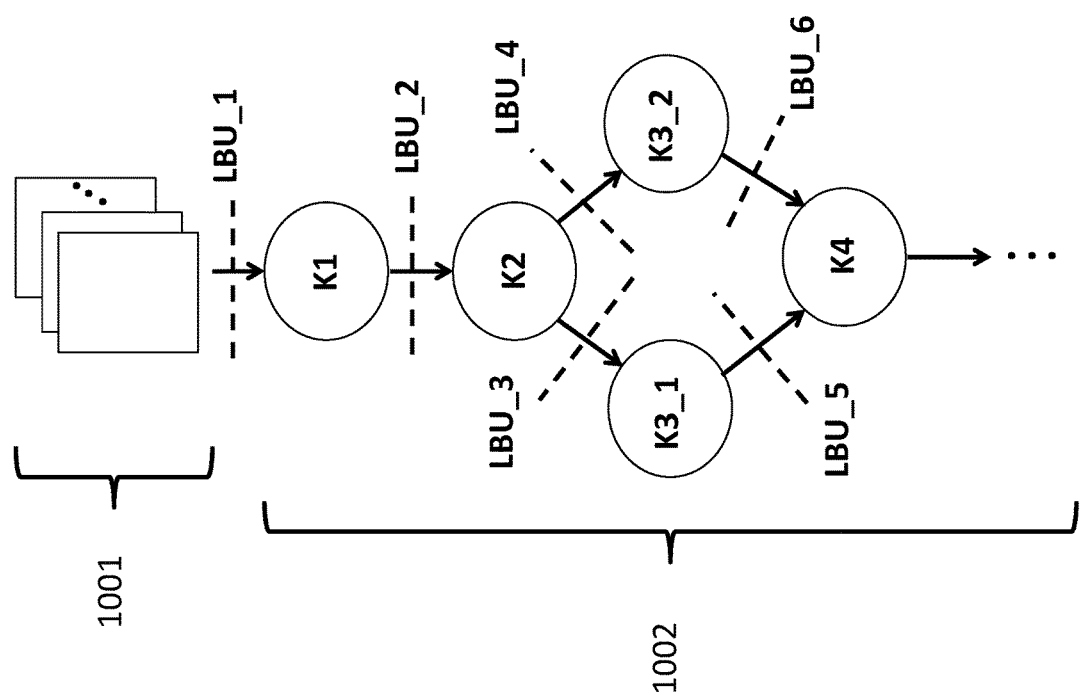
Figure 10B:
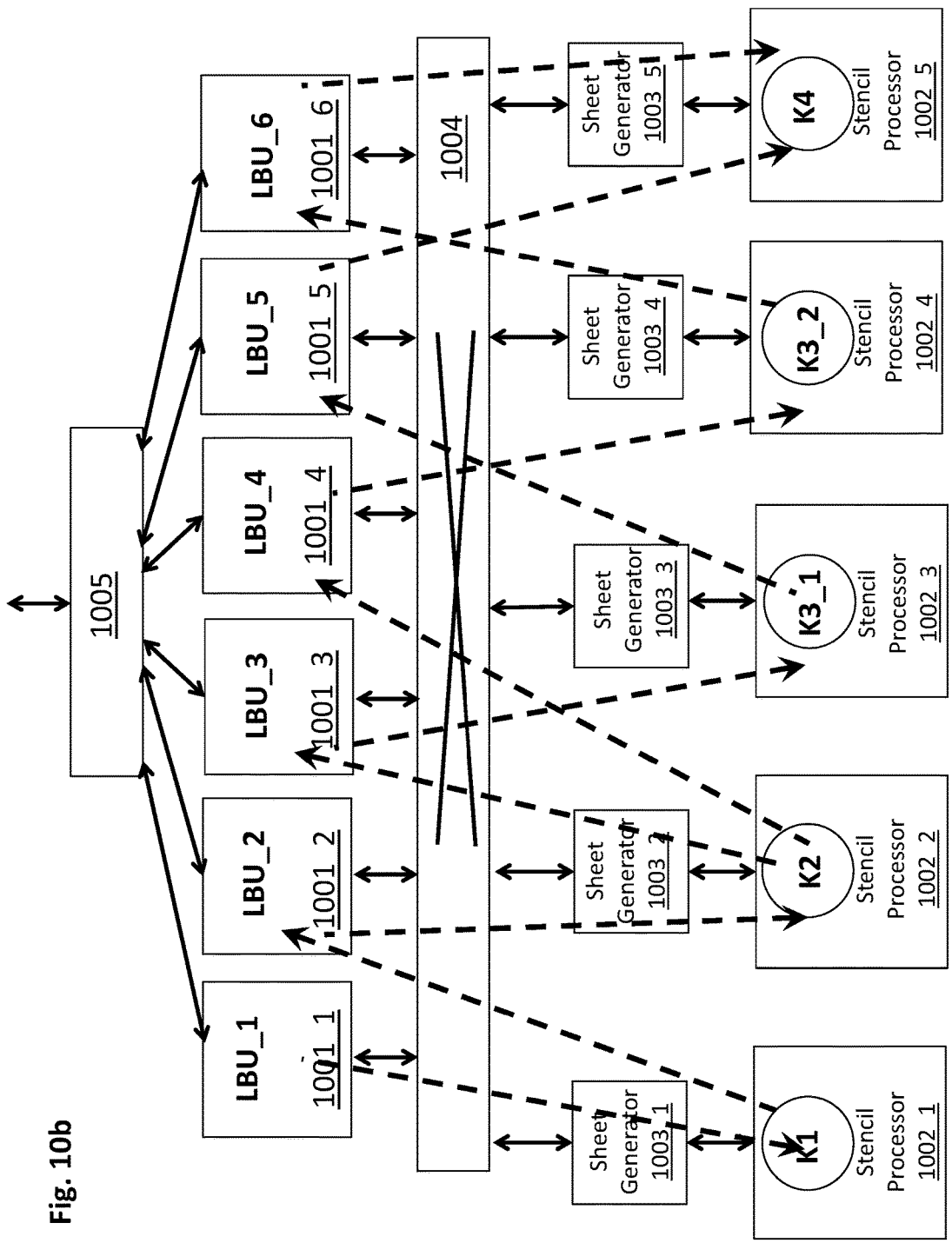
Figure 11A:
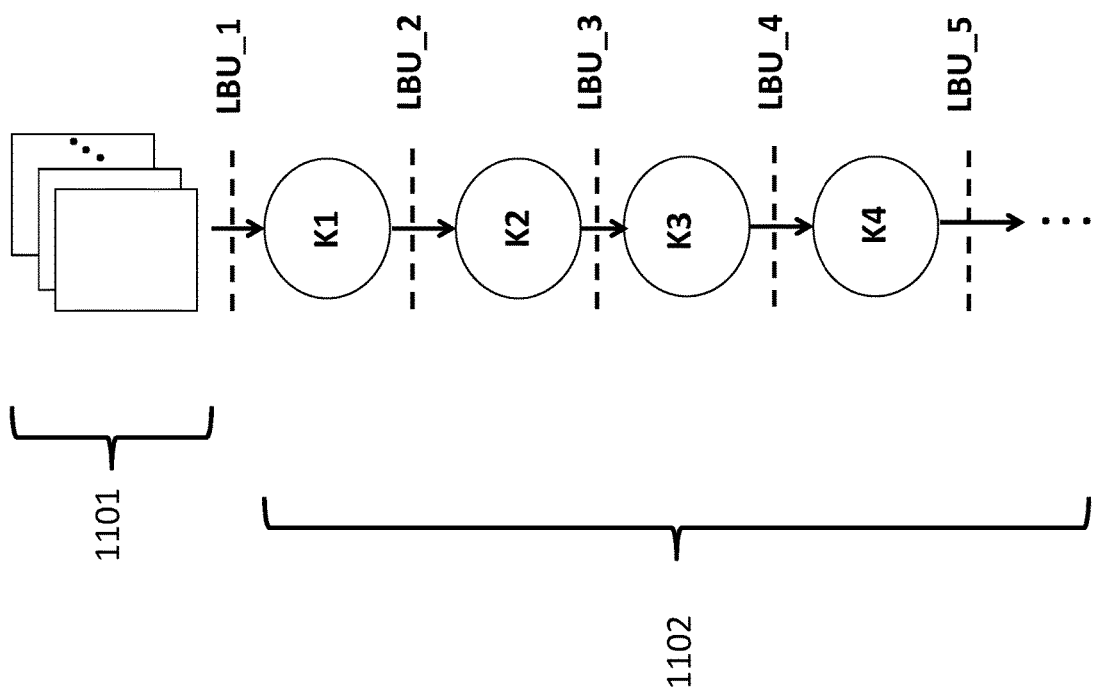
Figure 11B:
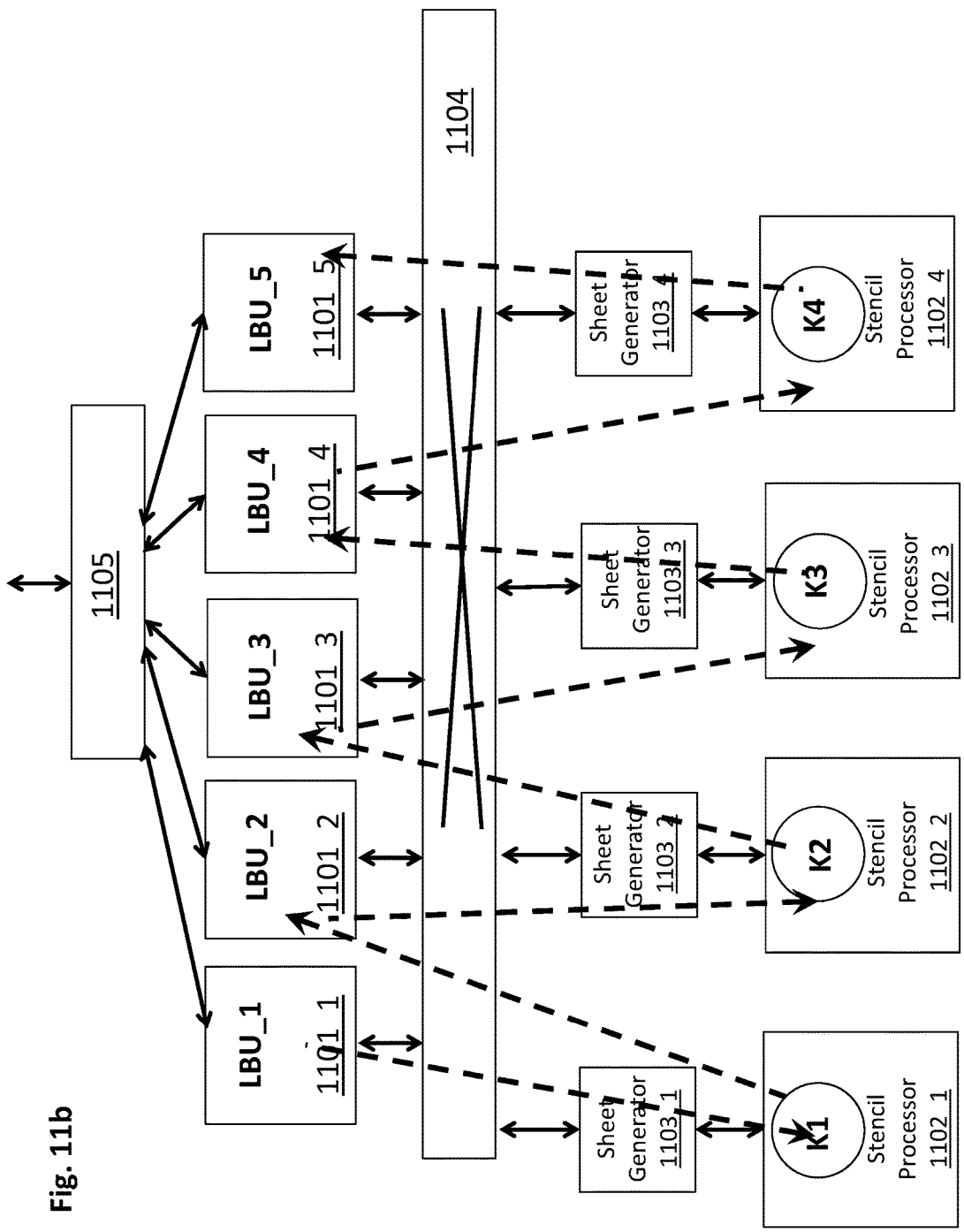
Figure 11C:
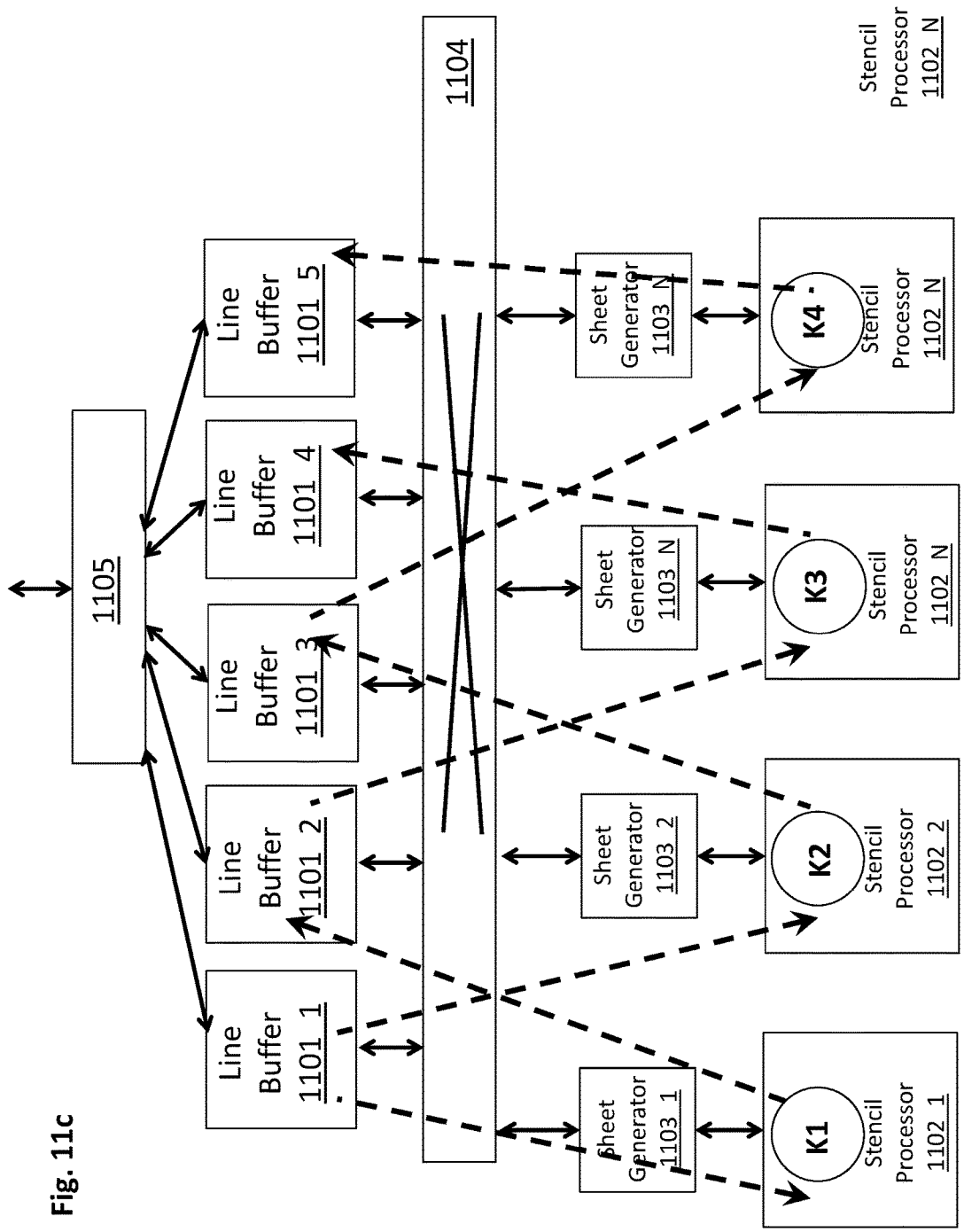
Figure 12A:
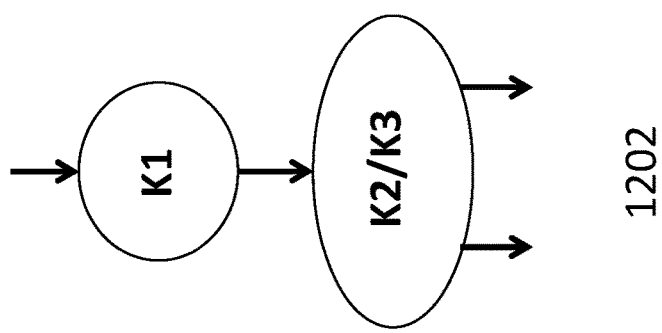
Figure 12A:
Figure 12A:
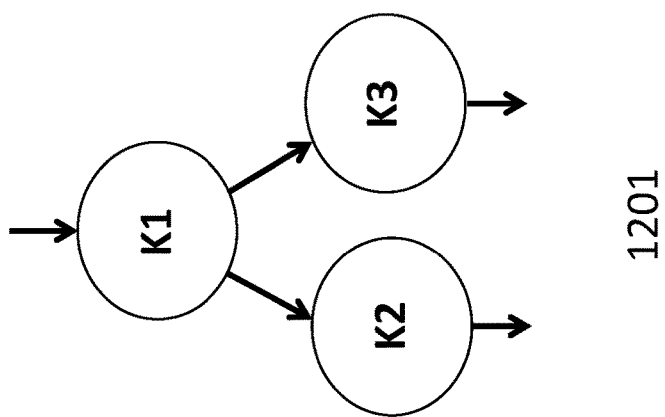
Figure 12B:
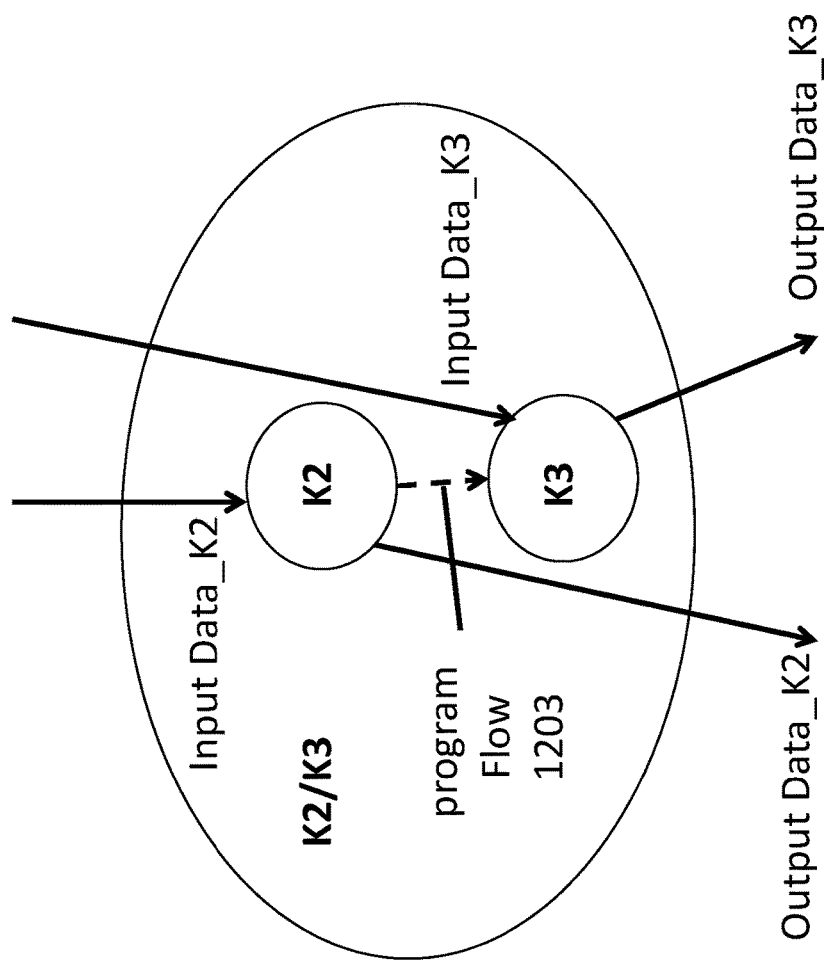
Figure 13A:
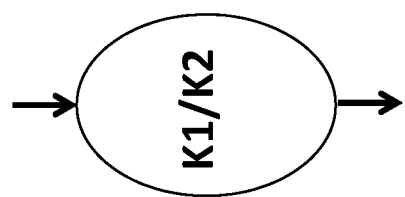
Figure 13A:
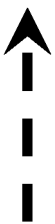
Figure 13A:
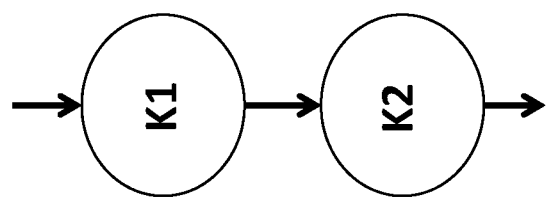
Figure 13B:
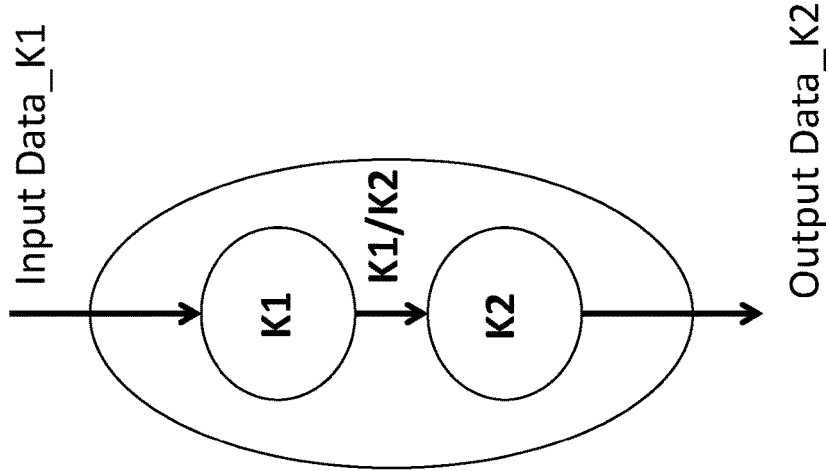
Figure 14:
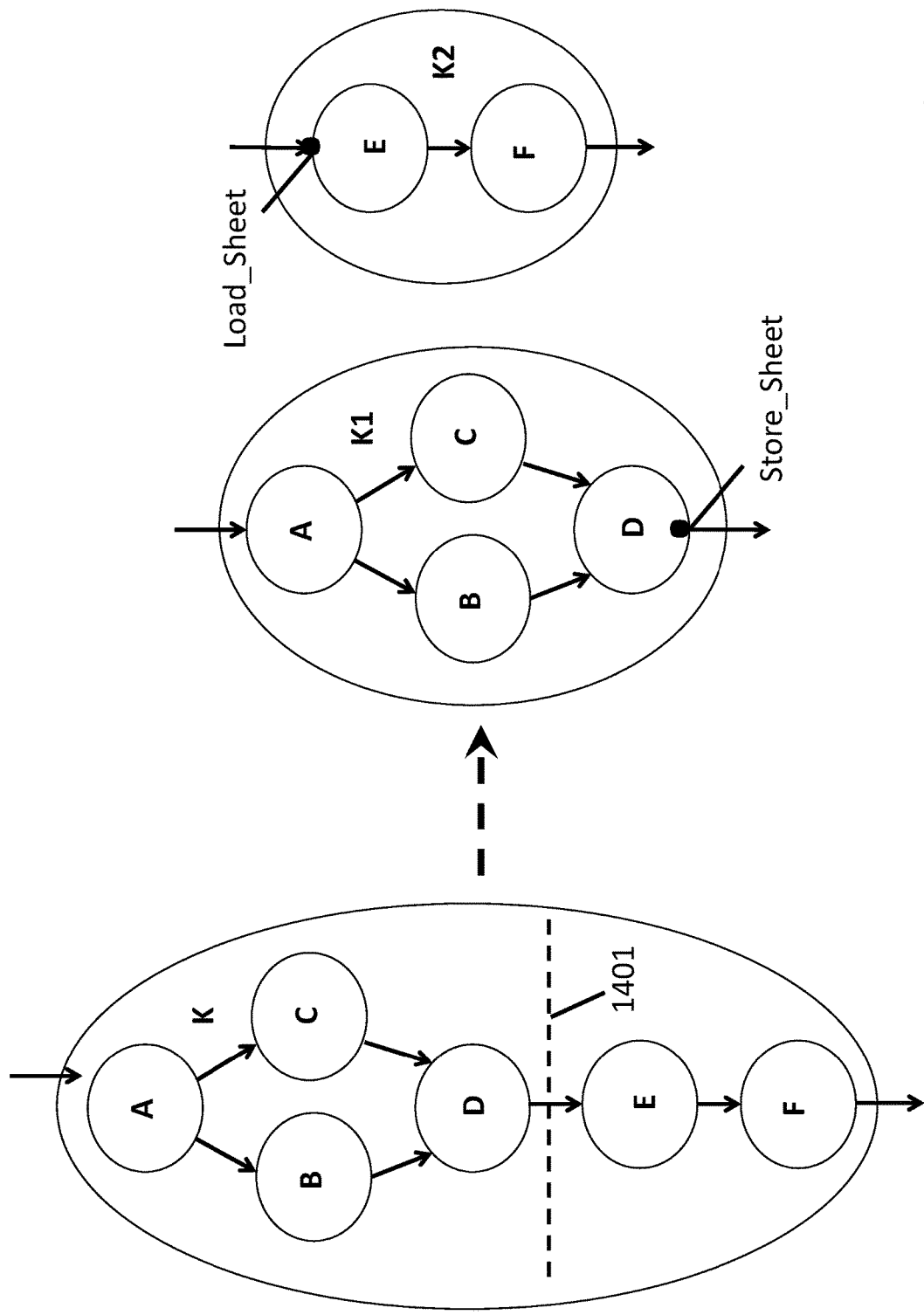
Figure 15:
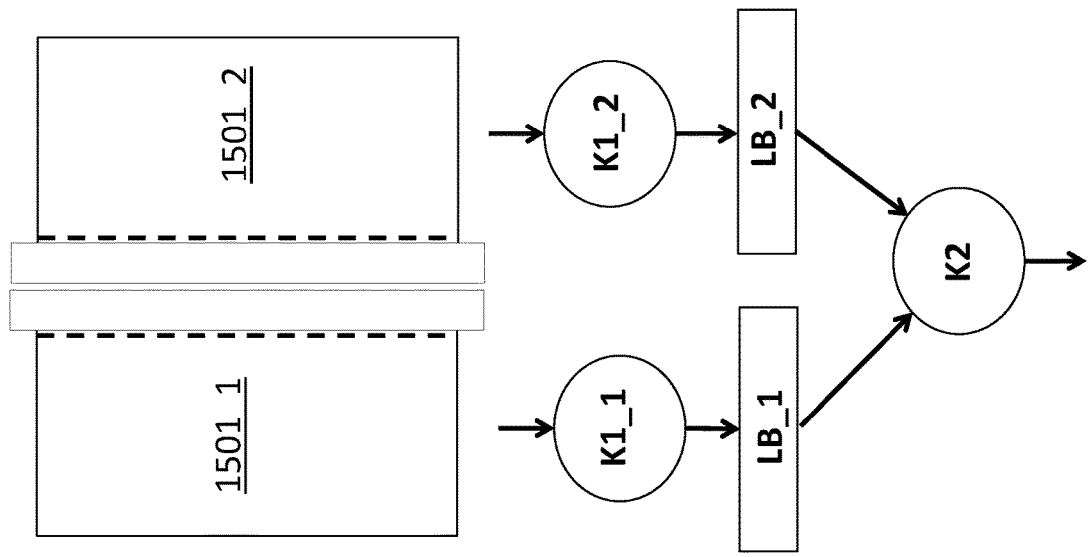
Figure 15:
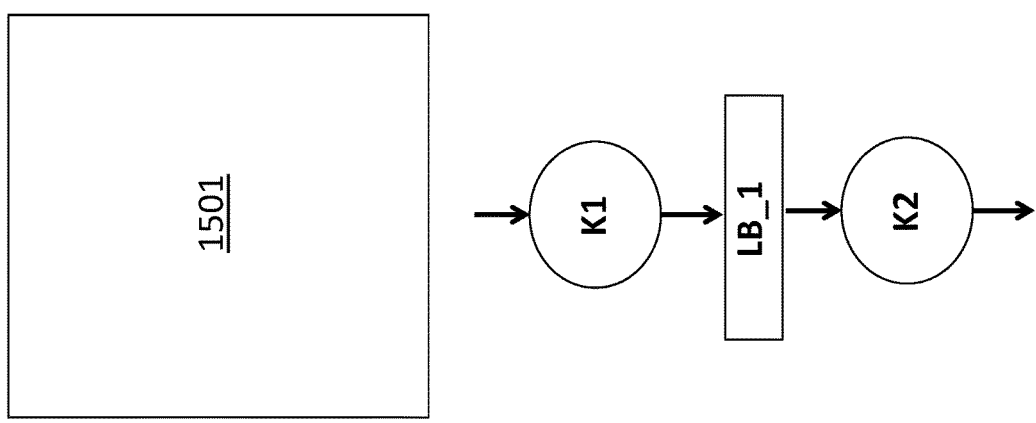
Figure 16:
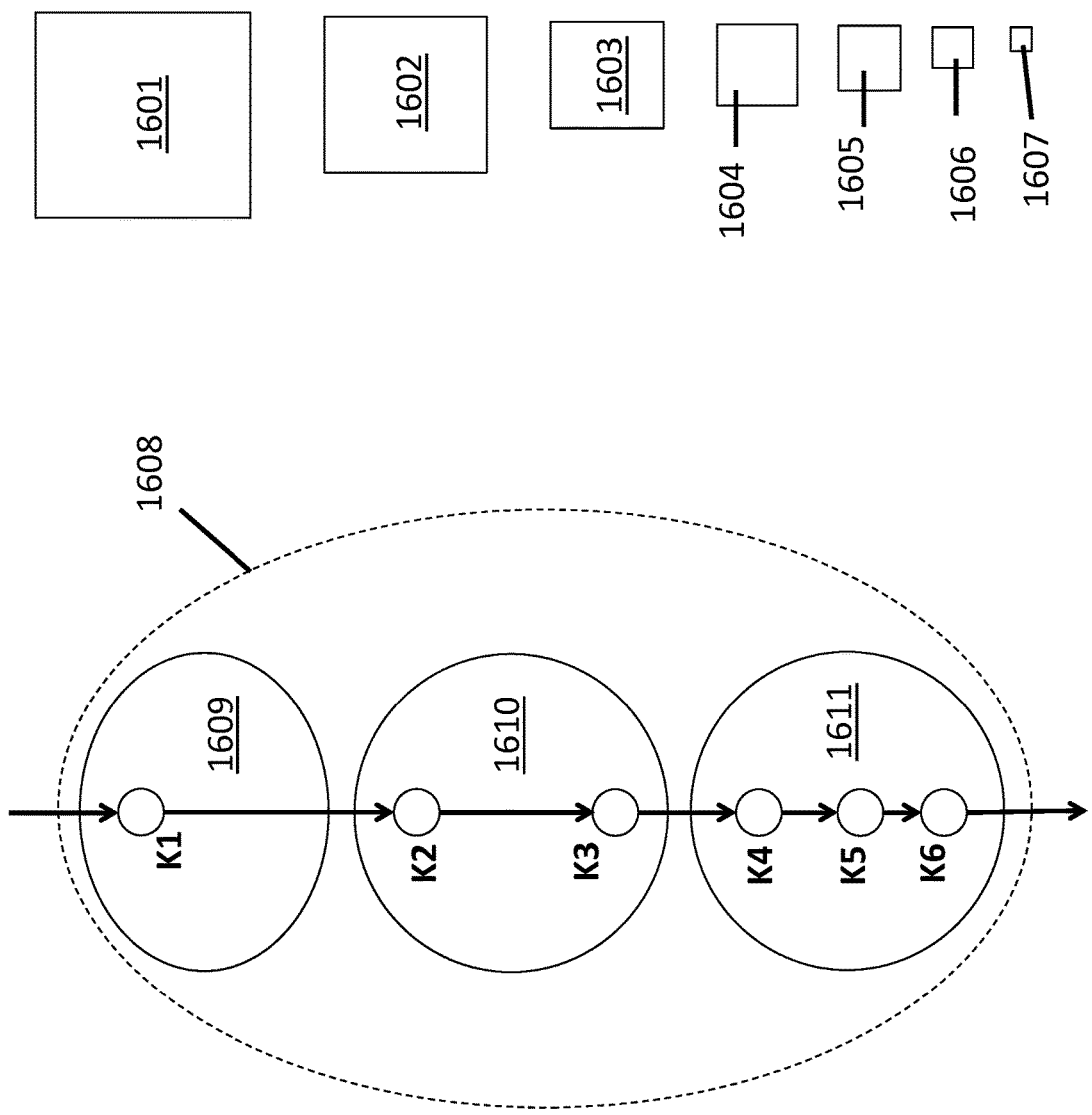
Figure 17B:
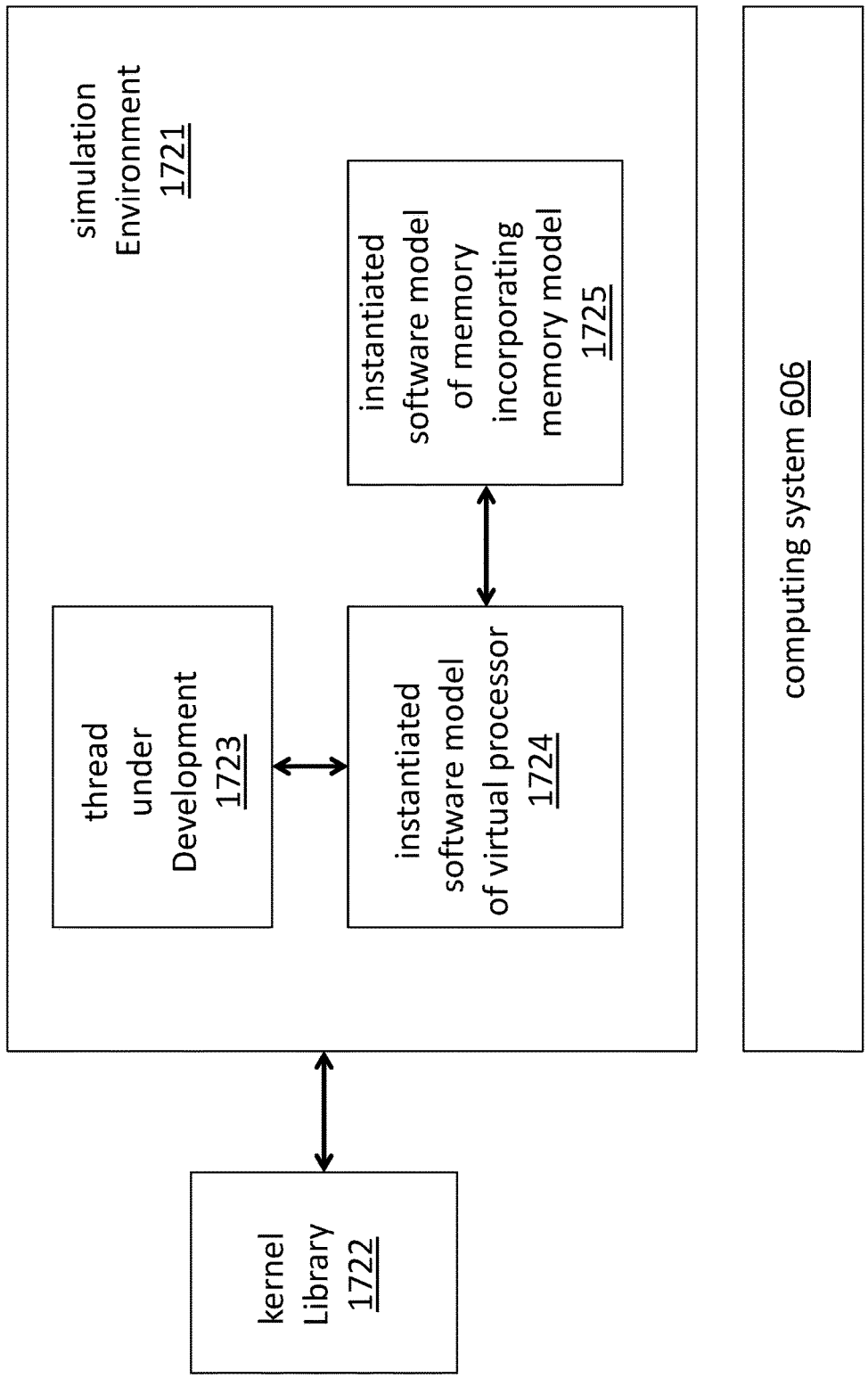

FIG. 8 pertains to a procedure for configuring an image processor;

FIGS. 9a and 9b pertain to the operation of a line buffer unit;

FIGS. 10a and 10b pertain to a DAG program flow;

FIGS. 11a, 11b and 11c pertain to a pipeline program flow;

FIGS. 12a and 12b pertain to a horizontal kernel fusion process;

FIGS. 13a, 13b and 13c pertain to a vertical kernel fusion process;

FIG. 14 pertains to a kernel fission process;

FIG. 15 pertains to a graphical partitioning process;

FIG. 16 pertains to a DAG/pipeline splitting process;

FIG. 17a shows a compiling method;

FIG. 17b shows a program code development environment;

FIG. 18 shows an exemplary computing system.

DETAILED DESCRIPTION a. Image Processor Hardware Architecture and Operation

Figure 1:
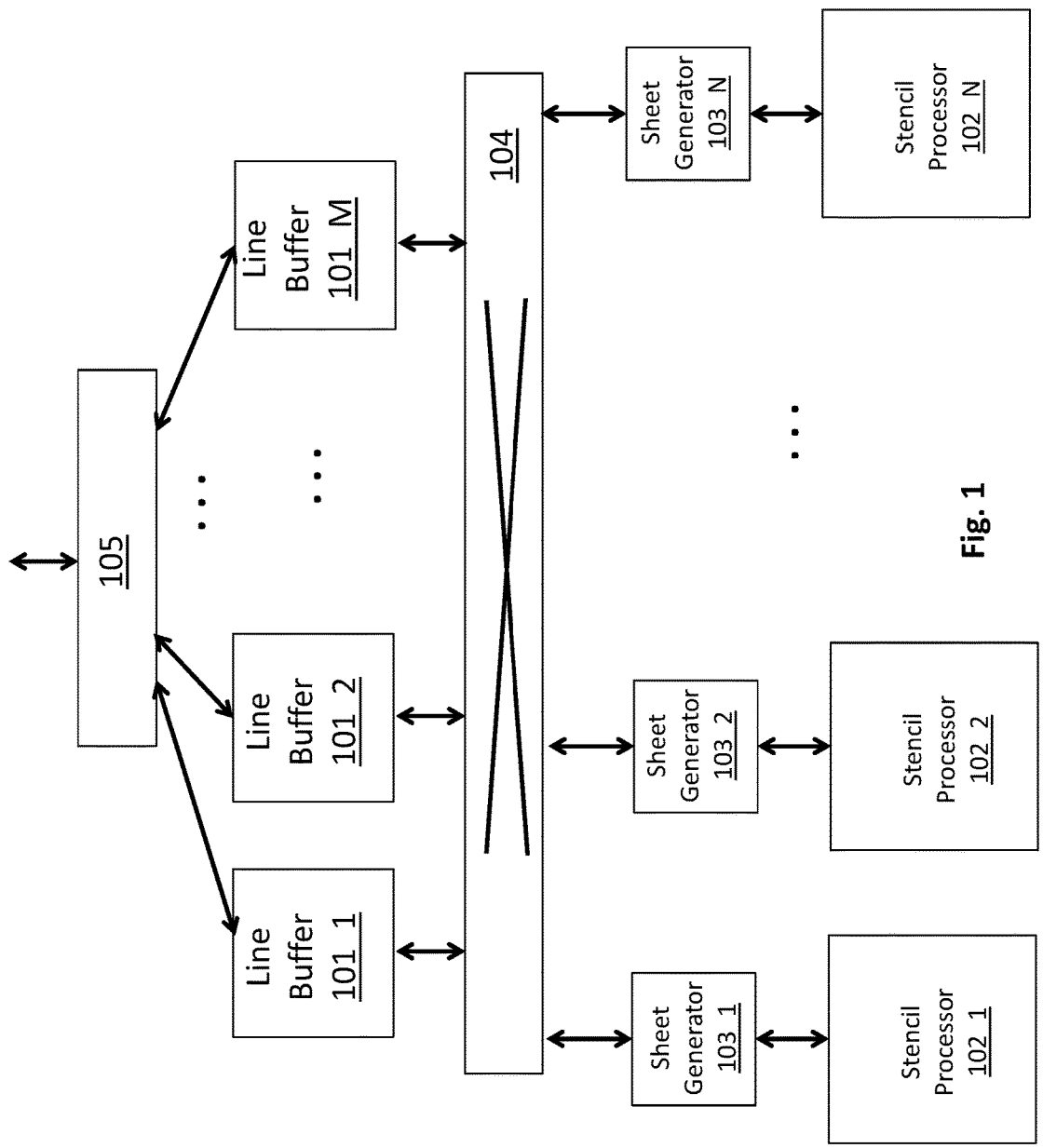
FIG. 1 shows an embodiment of an image processor hardware architecture.

FIG. 1 shows an embodiment of an architecture 100 for an image processor implemented in hardware. The image processor may be targeted, for example, by a compiler that converts program code written for a virtual processor within a simulated environment into program code that is actually executed by the hardware processor. As observed in FIG. 1, the architecture 100 includes a plurality of line buffer units 101_1 through 101_M interconnected to a plurality of stencil processor units 102_1 through 102_N and corresponding sheet generator units 103_1 through 103_N through a network 104 (e.g., a network on chip (NOC) including an on chip switch network, an on chip ring network or other kind of network). In an embodiment, any line buffer unit may connect to any sheet generator and corresponding stencil processor through the network 104.

In an embodiment, program code is compiled and loaded onto a corresponding stencil processor 102 to perform the image processing operations earlier defined by a software developer (program code may also be loaded onto the stencil processor's associated sheet generator 103, e.g., depending on design and implementation). In at least some instances an image processing pipeline may be realized by loading a first kernel program for a first pipeline stage into a first stencil processor 102_1, loading a second kernel program for a second pipeline stage into a second stencil processor 102_2, etc. where the first kernel performs the functions of the first stage of the pipeline, the second kernel performs the functions of the second stage of the pipeline, etc. and additional control flow methods are installed to pass output image data from one stage of the pipeline to the next stage of the pipeline.

In other configurations, the image processor may be realized as a parallel machine having two or more stencil processors 102_1, 102_2 operating the same kernel program code. For example, a highly dense and high data rate stream of image data may be processed by spreading frames across multiple stencil processors each of which perform the same function.

In yet other configurations, essentially any DAG of kernels may be loaded onto the hardware processor by configuring respective stencil processors with their own respective kernel of program code and configuring appropriate control flow hooks into the hardware to direct output images from one kernel to the input of a next kernel in the DAG design.

As a general flow, frames of image data are received by a macro I/O unit 105 and passed to one or more of the line buffer units 101 on a frame by frame basis. A particular line buffer unit parses its frame of image data into a smaller region of image data, referred to as a "a line group", and then passes the line group through the network 104 to a particular sheet generator. A complete or "full" singular line group may be composed, for example, with the data of multiple contiguous complete rows or columns of a frame (for simplicity the present specification will mainly refer to contiguous rows). The sheet generator further parses the line group of image data into a smaller region of image data, referred to as a "sheet", and presents the sheet to its corresponding stencil processor.

In the case of an image processing pipeline or a DAG flow having a single input, generally, input frames are directed to the same line buffer unit 101_1 which parses the image data into line groups and directs the line groups to the sheet generator 103_1 whose corresponding stencil processor 102_1 is executing the code of the first kernel in the pipeline/DAG. Upon completion of operations by the stencil processor 102_1 on the line groups it processes, the sheet generator 103_1 sends output line groups to a "downstream" line buffer unit 101_2 (in some use cases the output line group may be sent back to the same line buffer unit 101_1 that earlier had sent the input line groups).

One or more "consumer" kernels that represent the next stage/operation in the pipeline/DAG executing on their own respective other sheet generator and stencil processor (e.g., sheet generator 103_2 and stencil processor 102_2) then receive from the downstream line buffer unit 101_2 the image data generated by the first stencil processor 102_1. In this manner, a "producer" kernel operating on a first stencil processor has its output data forwarded to a "consumer" kernel operating on a second stencil processor where the consumer kernel performs the next set of tasks after the producer kernel consistent with the design of the overall pipeline or DAG.

A stencil processor 102 is designed to simultaneously operate on multiple overlapping stencils of image data. The multiple overlapping stencils and internal hardware processing capacity of the stencil processor effectively determines the size of a sheet. Here, within a stencil processor 102, arrays of execution lanes operate in unison to simultaneously process the image data surface area covered by the multiple overlapping stencils.

As will be described in more detail below, in various embodiments, sheets of image data are loaded into a two-dimensional register array structure within the stencil processor 102. The use of sheets and the two-dimensional register array structure is believed to effectively provide for power consumption improvements by moving a large amount of data into a large amount of register space as, e.g., a single load operation with processing tasks performed directly on the data immediately thereafter by an execution lane array. Additionally, the use of an execution lane array and corresponding register array provide for different stencil sizes that are easily programmable/configurable.

FIGS. 2a through 2e illustrate at a high level embodiments of both the parsing activity of a line buffer unit 101, the finer grained parsing activity of a sheet generator unit 103 as well as the stencil processing activity of the stencil processor 102 that is coupled to the sheet generator unit 103.

Figure 2A:
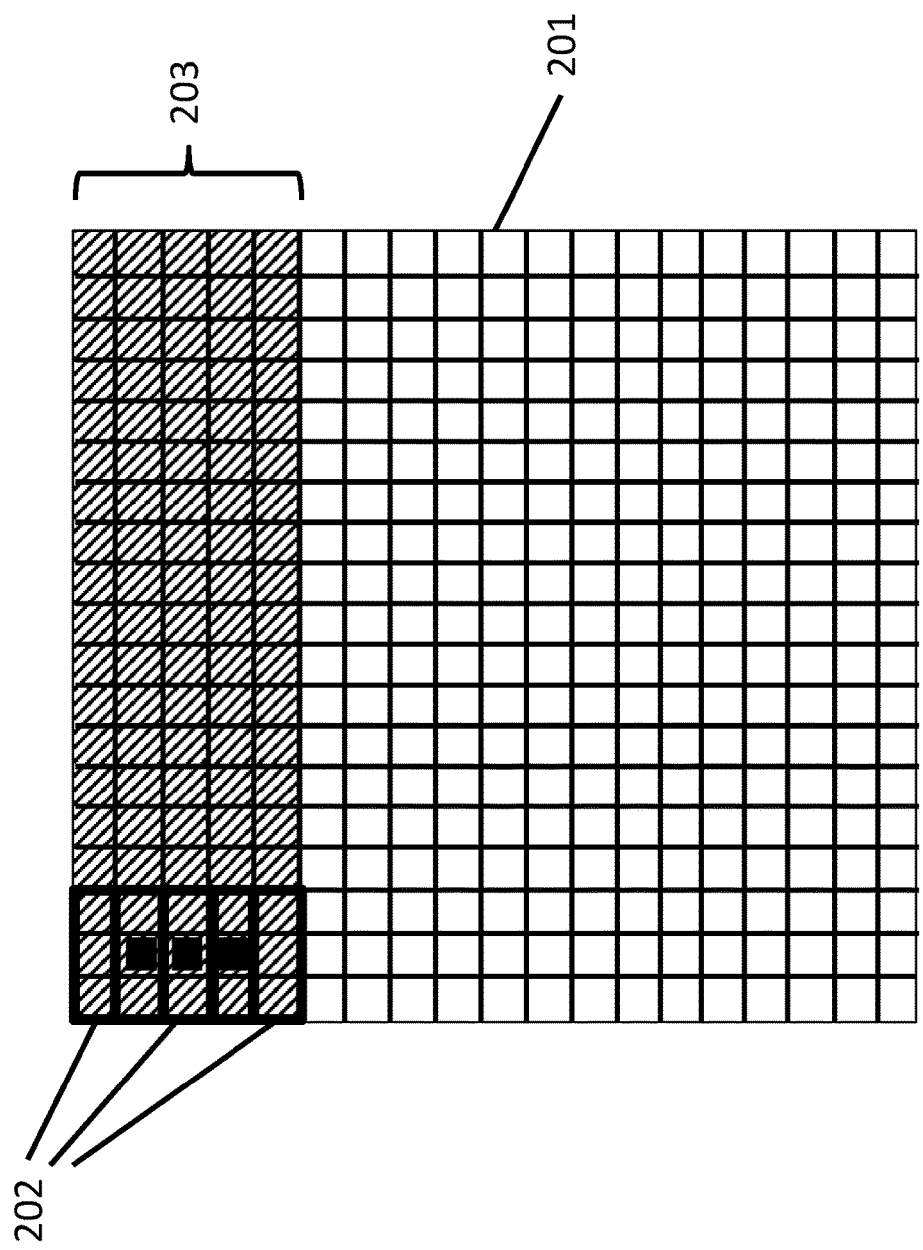
Figure 2C:
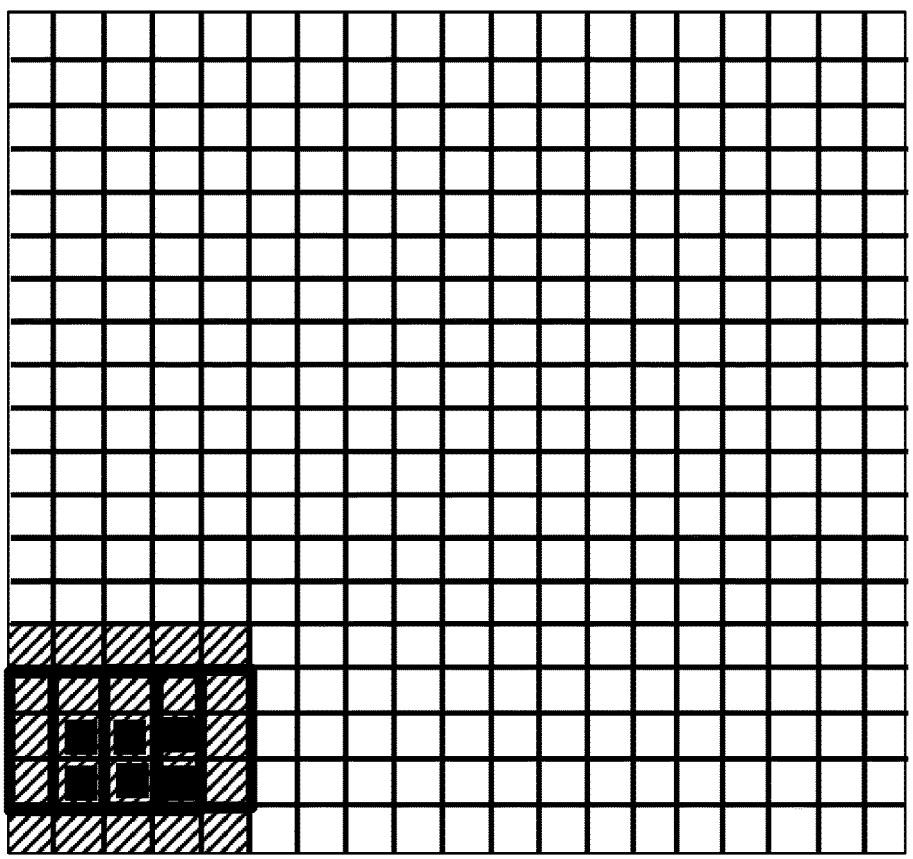
Figure 2D:
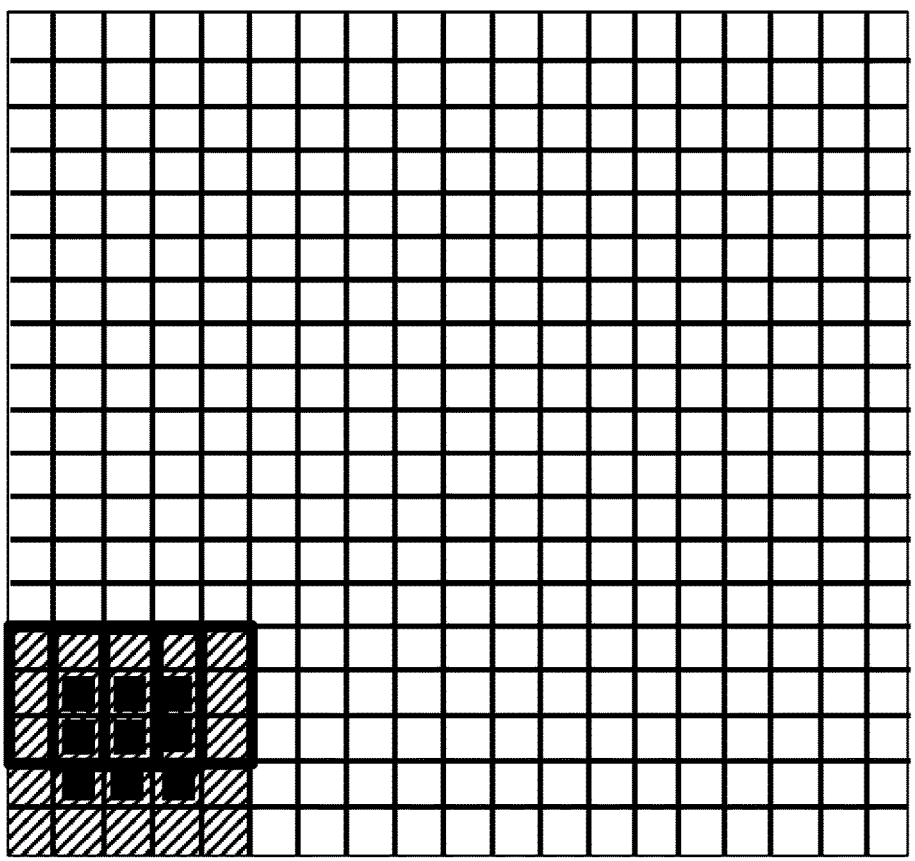

FIG. 2a depicts an embodiment of an input frame of image data 201. FIG. 2a also depicts an outline of three overlapping stencils 202 (each having a dimension of 3 pixels×3 pixels) that a stencil processor is designed to operate over. The output pixel that each stencil respectively generates output image data for is highlighted in solid black. For simplicity, the three overlapping stencils 202 are depicted as overlapping only in the vertical direction. It is pertinent to recognize that in actuality a stencil processor may be designed to have overlapping stencils in both the vertical and horizontal directions.

Because of the vertical overlapping stencils 202 within the stencil processor, as observed in FIG. 2a, there exists a wide band of image data within the frame that a single stencil processor can operate over. As will be discussed in more detail below, in an embodiment, the stencil processors process data within their overlapping stencils in a left to right fashion across the image data (and then repeat for the next set of lines, in top to bottom order). Thus, as the stencil processors continue forward with their operation, the number of solid black output pixel blocks will grow right-wise horizontally. As discussed above, a line buffer unit 101 is responsible for parsing a line group of input image data from an incoming frame that is sufficient for the stencil processors to operate over for an extended number of upcoming cycles. An exemplary depiction of a line group is illustrated as a shaded region 203. In an embodiment, the line buffer unit 101 can comprehend different dynamics for sending/receiving a line group to/from a sheet generator. For example, according to one mode, referred to as "full group", the complete full width lines of image data are passed between a line buffer unit and a sheet generator. According to a second mode, referred to as "virtually tall", a line group is passed initially with a subset of full width rows. The remaining rows are then passed sequentially in smaller (less than full width) pieces.

With the line group 203 of the input image data having been defined by the line buffer unit and passed to the sheet generator unit, the sheet generator unit further parses the line group into finer sheets that are more precisely fitted to the hardware limitations of the stencil processor. More specifically, as will be described in more detail further below, in an embodiment, each stencil processor consists of a two dimensional shift register array. The two dimensional shift register array essentially shifts image data "beneath" an array of execution lanes where the pattern of the shifting causes each execution lane to operate on data within its own respective stencil (that is, each execution lane processes on its own stencil of information to generate an output for that stencil). In an embodiment, sheets are surface areas of input image data that "fill" or are otherwise loaded into the two dimensional shift register array.

As will be described in more detail below, in various embodiments, there are actually multiple layers of two dimensional register data that can be shifted on any cycle. For convenience, much of the present description will simply use the term "two-dimensional shift register" and the like to refer to structures that have one or more such layers of two-dimensional register data that can be shifted.

Thus, as observed in FIG. 2b, the sheet generator parses an initial sheet 204 from the line group 203 and provides it to the stencil processor (here, the sheet of data corresponds to the shaded region that is generally identified by reference number 204). As observed in FIGS. 2c and 2d, the stencil processor operates on the sheet of input image data by effectively moving the overlapping stencils 202 in a left to right fashion over the sheet. As of FIG. 2d, the number of pixels for which an output value could be calculated from the data within the sheet is exhausted (no other pixel positions can have an output value determined from the information within the sheet). For simplicity the border regions of the image have been ignored.

As observed in FIG. 2e the sheet generator then provides a next sheet 205 for the stencil processor to continue operations on. Note that the initial positions of the stencils as they begin operation on the next sheet is the next progression to the right from the point of exhaustion on the first sheet (as depicted previously in FIG. 2d). With the new sheet 205, the stencils will simply continue moving to the right as the stencil processor operates on the new sheet in the same manner as with the processing of the first sheet.

Note that there is some overlap between the data of the first sheet 204 and the data of the second sheet 205 owing to the border regions of stencils that surround an output pixel location. The overlap could be handled simply by the sheet generator re-transmitting the overlapping data twice. In alternate implementations, to feed a next sheet to the stencil processor, the sheet generator may proceed to only send new data to the stencil processor and the stencil processor reuses the overlapping data from the previous sheet.

b. Stencil Processor Design and Operation

Figure 3A:
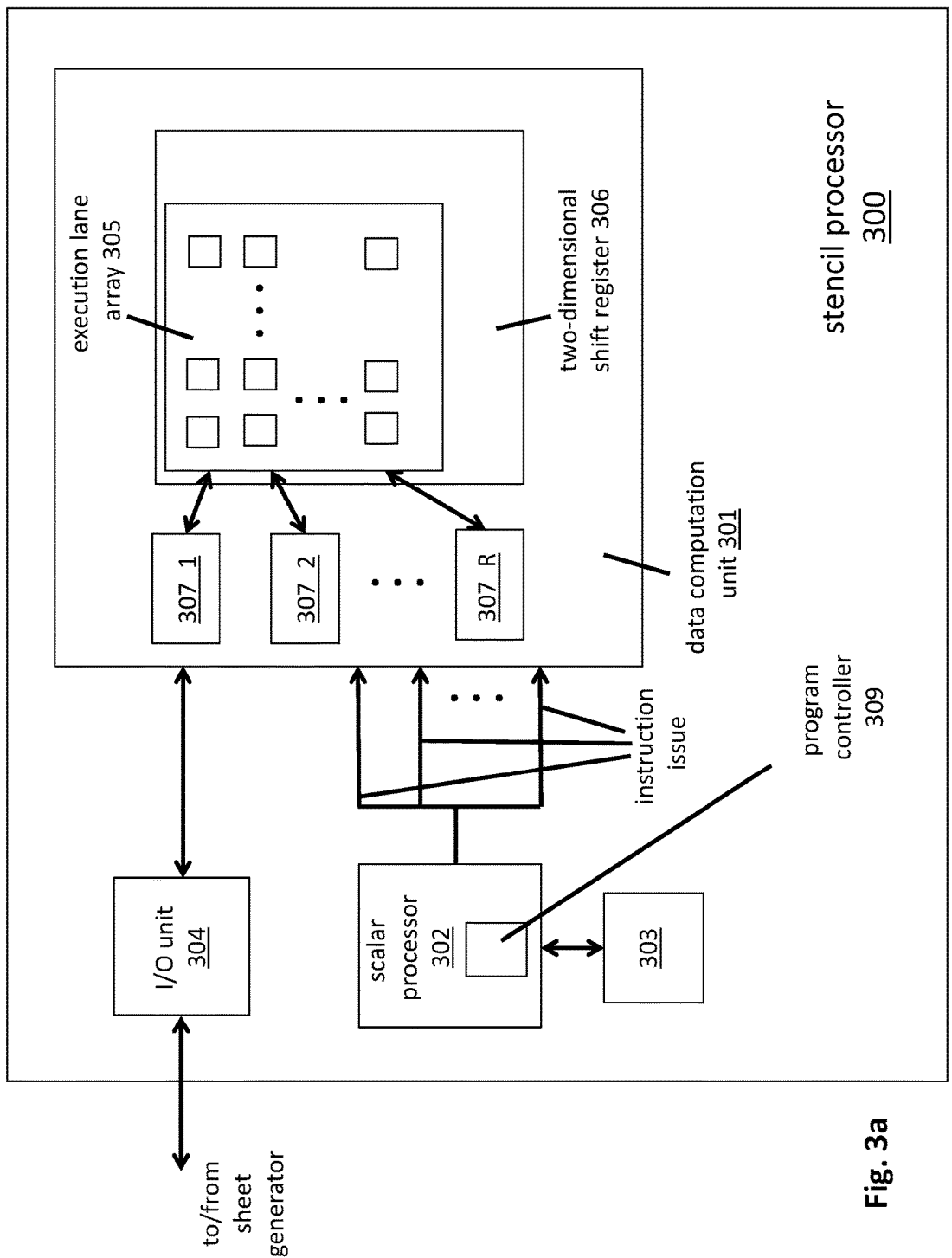
FIG. 3a shows an embodiment of a stencil processor.

FIG. 3 shows an embodiment of a stencil processor architecture 300. As observed in FIG. 3, the stencil processor includes a data computation unit 301, a scalar processor 302 and associated memory 303 and an I/O unit 304. The data computation unit 301 includes an array of execution lanes 305, a two-dimensional shift array structure 306 and separate random access memories 307 associated with specific rows or columns of the array.

The I/O unit 304 is responsible for loading "input" sheets of data received from the sheet generator into the data computation unit 301 and storing "output" sheets of data from the stencil processor into the sheet generator. In an embodiment the loading of sheet data into the data computation unit 301 entails parsing a received sheet into rows/columns of image data and loading the rows/columns of image data into the two dimensional shift register structure 306 or respective random access memories 307 of the rows/columns of the execution lane array (described in more detail below). If the sheet is initially loaded into memories 307, the individual execution lanes within the execution lane array 305 may then load sheet data into the two-dimensional shift register structure 306 from the random access memories 307 when appropriate (e.g., as a load instruction just prior to operation on the sheet's data). Upon completion of the loading of a sheet of data into the register structure 306 (whether directly from a sheet generator or from memories 307), the execution lanes of the execution lane array 305 operate on the data and eventually "write back" finished data as a sheet directly back to the sheet generator, or, into the random access memories 307. If the later the I/O unit 304 fetches the data from the random access memories 307 to form an output sheet which is then forwarded to the sheet generator.

The scalar processor 302 includes a program controller 309 that reads the instructions of the stencil processor's program code from scalar memory 303 and issues the instructions to the execution lanes in the execution lane array 305. In an embodiment, a single same instruction is broadcast to all execution lanes within the array 305 to effect a SIMD-like behavior from the data computation unit 301. In an embodiment, the instruction format of the instructions read from scalar memory 303 and issued to the execution lanes of the execution lane array 305 includes a very-long-instruction-word (VLIW) type format that includes more than one opcode per instruction. In a further embodiment, the VLIW format includes both an ALU opcode that directs a mathematical function performed by each execution lane's ALU (which, as described below, in an embodiment may specify more than one traditional ALU operation) and a memory opcode (that directs a memory operation for a specific execution lane or set of execution lanes).

The term "execution lane" refers to a set of one or more execution units capable of executing an instruction (e.g., logic circuitry that can execute an instruction). An execution lane can, in various embodiments, include more processor-like functionality beyond just execution units, however. For example, besides one or more execution units, an execution lane may also include logic circuitry that decodes a received instruction, or, in the case of more MIMD-like designs, logic circuitry that fetches and decodes an instruction. With respect to MIMD-like approaches, although a centralized program control approach has largely been described herein, a more distributed approach may be implemented in various alternative embodiments (e.g., including program code and a program controller within each execution lane of the array 305).

The combination of an execution lane array 305, program controller 309 and two dimensional shift register structure 306 provides a widely adaptable/configurable hardware platform for a broad range of programmable functions. For example, application software developers are able to program kernels having a wide range of different functional capability as well as dimension (e.g., stencil size) given that the individual execution lanes are able to perform a wide variety of functions and are able to readily access input image data proximate to any output array location.

Apart from acting as a data store for image data being operated on by the execution lane array 305, the random access memories 307 may also keep one or more look-up tables. In various embodiments one or more scalar look-up tables may also be instantiated within the scalar memory 303.

A scalar look-up involves passing the same data value from the same look-up table from the same index to each of the execution lanes within the execution lane array 305. In various embodiments, the VLIW instruction format described above is expanded to also include a scalar opcode that directs a look-up operation performed by the scalar processor into a scalar look-up table. The index that is specified for use with the opcode may be an immediate operand or fetched from some other data storage location. Regardless, in an embodiment, a look-up from a scalar look-up table within scalar memory essentially involves broadcasting the same data value to all execution lanes within the execution lane array 305 during the same clock cycle. Additional details concerning use and operation of look-up tables is provided further below.

Figure 3B:
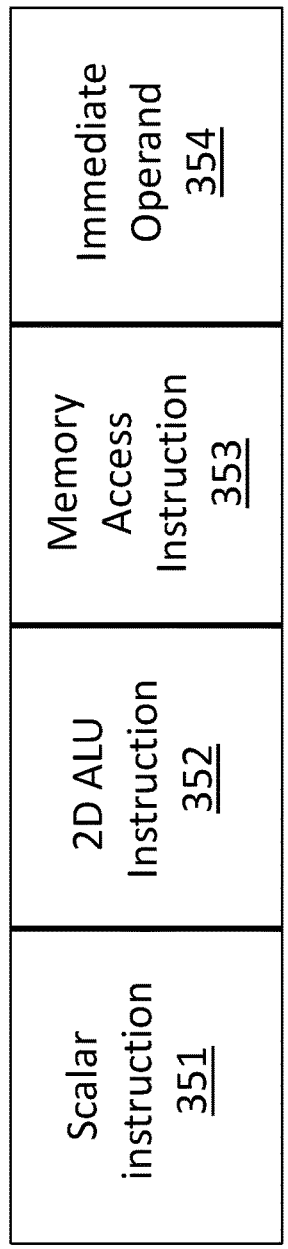
FIG. 3b shows an embodiment of an instruction word of the stencil processor.

FIG. 3b summarizes the VLIW instruction word embodiments(s) discussed above. As observed in FIG. 3b, the VLIW instruction word format includes fields for three separate instructions: 1) a scalar instruction 351 that is executed by the scalar processor; 2) an ALU instruction 352 that is broadcasted and executed in SIMD fashion by the respective ALUs within the execution lane array; and, 3) a memory instruction 353 that is broadcasted and executed in a partial SIMD fashion (e.g., if execution lanes along a same row in the execution lane array share a same random access memory, then one execution lane from each of the different rows actually execute the instruction (the format of the memory instruction 353 may include an operand that identifies which execution lane from each row executes the instruction)

A field 354 for one or more immediate operands is also included. Which of the instructions 351, 352, 353 use which immediate operand information may be identified in the instruction format. Each of instructions 351, 352, 353 also include their own respective input operand and resultant information (e.g., local registers for ALU operations and a local register and a memory address for memory access instructions). In an embodiment, the scalar instruction 351 is executed by the scalar processor before the execution lanes within the execution lane array execute either of the other two instructions 352, 353. That is, the execution of the VLIW word includes a first cycle upon which the scalar instruction 351 is executed followed by a second cycle upon with the other instructions 352, 353 may be executed (note that in various embodiments instructions 352 and 353 may be executed in parallel).

In an embodiment, the scalar instructions executed by the scalar processor include commands issued to the sheet generator to load/store sheets from/into the memories or 2D shift register of the data computation unit. Here, the sheet generator's operation can be dependent on the operation of the line buffer unit or other variables that prevent pre-runtime comprehension of the number of cycles it will take the sheet generator to complete any command issued by the scalar processor. As such, in an embodiment, any VLIW word whose scalar instruction 351 corresponds to or otherwise causes a command to be issued to the sheet generator also includes no-operation (NOOP) instructions in the other two instruction field 352, 353. The program code then enters a loop of NOOP instructions for instruction fields 352, 353 until the sheet generator completes its load/store to/from the data computation unit. Here, upon issuing a command to the sheet generator, the scalar processor may set a bit of an interlock register that the sheet generator resets upon completion of the command. During the NOOP loop the scalar processor monitors the bit of the interlock bit. When the scalar processor detects that the sheet generator has completed its command normal execution begins again.

Figure 4:
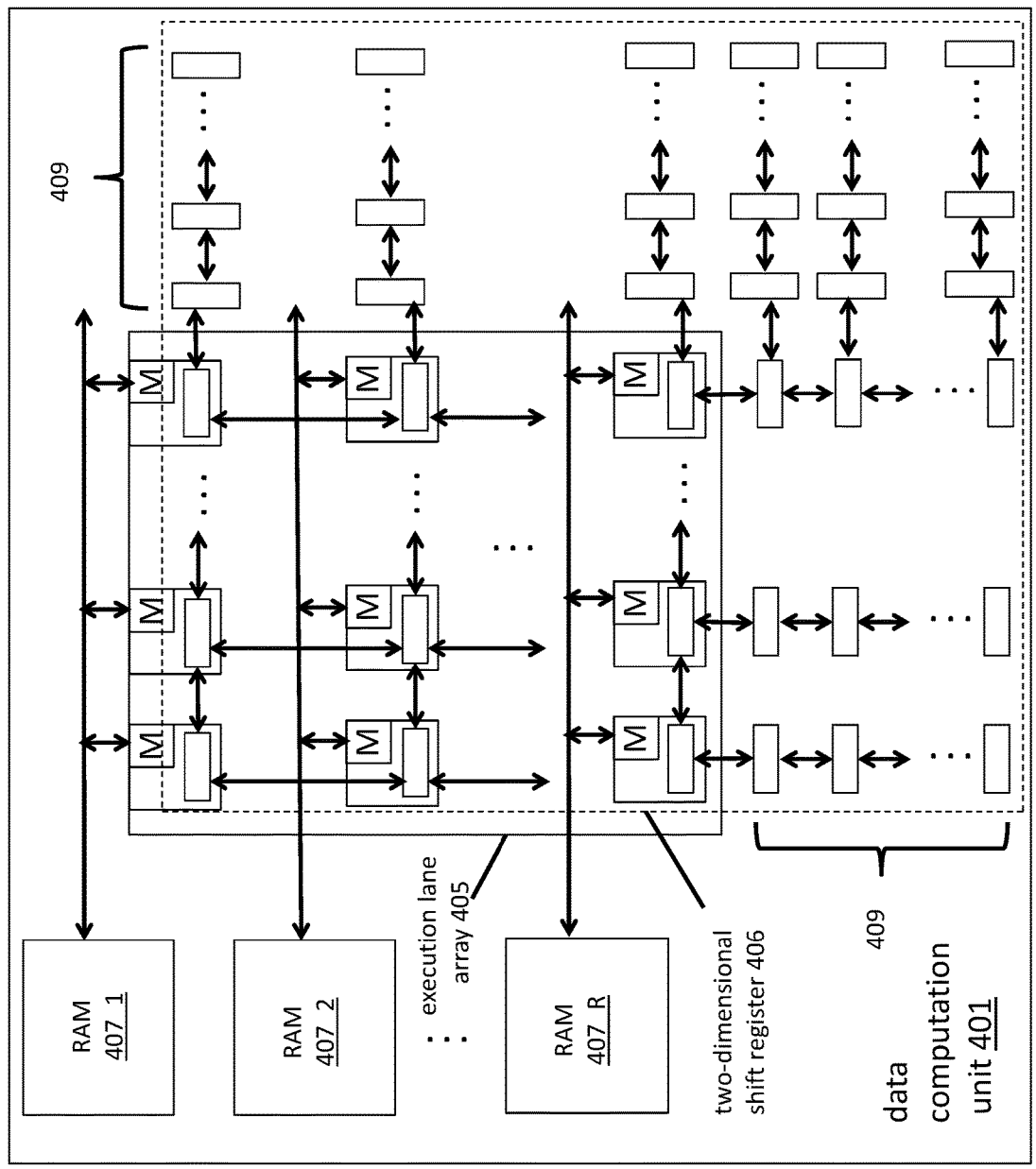
FIG. 4 shows an embodiment of a data computation unit within a stencil processor.

FIG. 4 shows an embodiment of a data computation component 401. As observed in FIG. 4, the data computation component 401 includes an array of execution lanes 405 that are logically positioned "above" a two-dimensional shift register array structure 406. As discussed above, in various embodiments, a sheet of image data provided by a sheet generator is loaded into the two-dimensional shift register 406. The execution lanes then operate on the sheet data from the register structure 406.

The execution lane array 405 and shift register structure 406 are fixed in position relative to one another. However, the data within the shift register array 406 shifts in a strategic and coordinated fashion to cause each execution lane in the execution lane array to process a different stencil within the data. As such, each execution lane determines the output image value for a different pixel in the output sheet being generated. From the architecture of FIG. 4 it should be clear that overlapping stencils are not only arranged vertically but also horizontally as the execution lane array 405 includes vertically adjacent execution lanes as well as horizontally adjacent execution lanes.

Some notable architectural features of the data computation unit 401 include the shift register structure 406 having wider dimensions than the execution lane array 405. That is, there is a "halo" of registers 409 outside the execution lane array 405. Although the halo 409 is shown to exist on two sides of the execution lane array, depending on implementation, the halo may exist on less (one) or more (three or four) sides of the execution lane array 405. The halo 405 serves to provide "spill-over" space for data that spills outside the bounds of the execution lane array 405 as the data is shifting "beneath" the execution lanes 405. As a simple case, a 5×5 stencil centered on the right edge of the execution lane array 405 will need four halo register locations further to the right when the stencil's leftmost pixels are processed. For ease of drawing, FIG. 4 shows the registers of the right side of the halo as only having horizontal shift connections and registers of the bottom side of the halo as only having vertical shift connections when, in a nominal embodiment, registers on either side (right, bottom) would have both horizontal and vertical connections. In various embodiments, the halo region does not include corresponding execution lane logic to execute image processing instructions (e.g., no ALU is present). However, individual memory access units (M) are present in each of the halo region locations so that the individual halo register locations can individually load data from memory and store data to memory.

Additional spill-over room is provided by random access memories 407 that are coupled to each row and/or each column in the array, or portions thereof (E.g., a random access memory may be assigned to a "region" of the execution lane array that spans 4 execution lanes row wise and 2 execution lanes column wise. For simplicity the remainder of the application will refer mainly to row and/or column based allocation schemes). Here, if an execution lane's kernel operations require it to process pixel values outside of the two-dimensional shift register array 406 (which some image processing routines may require) the plane of image data is able to further spill-over, e.g., from the halo region 409 into random access memory 407. For example, consider a 6×6 stencil where the hardware includes a halo region of only four storage elements to the right of an execution lane on the right edge of the execution lane array. In this case, the data would need to be shifted further to the right off the right edge of the halo 409 to fully process the stencil. Data that is shifted outside the halo region 409 would then spill-over to random access memory 407. Other applications of the random access memories 407 and the stencil processor of FIG. 3 are provided further below.

FIGS. 5a through 5k demonstrate a working example of the manner in which image data is shifted within the two dimensional shift register array "beneath" the execution lane array as alluded to above. As observed in FIG. 5a, the data contents of the two dimensional shift array are depicted in a first array 507 and the execution lane array is depicted by a frame 505. Also, two neighboring execution lanes 510 within the execution lane array are simplistically depicted. In this simplistic depiction 510, each execution lane includes a register R1 that can accept data from the shift register, accept data from an ALU output (e.g., to behave as an accumulator across cycles), or write output data into an output destination.

Each execution lane also has available, in a local register R2, the contents "beneath" it in the two dimensional shift array. Thus, R1 is a physical register of the execution lane while R2 is a physical register of the two dimensional shift register array. The execution lane includes an ALU that can operate on operands provided by R1 and/or R2. As will be described in more detail further below, in an embodiment the shift register is actually implemented with multiple (a "depth" of) storage/register elements per array location but the shifting activity is limited to one plane of storage elements (e.g., only one plane of storage elements can shift per cycle). FIGS. 5a through 5k depict one of these deeper register locations as being used to store the resultant X from the respective execution lanes. For illustrative ease the deeper resultant register is drawn alongside rather than beneath its counterpart register R2.

FIGS. 5a through 5k focus on the calculation of two stencils whose central position is aligned with the pair of execution lane positions 511 depicted within the execution lane array. For ease of illustration, the pair of execution lanes 510 are drawn as horizontal neighbors when in fact, according to the following example, they are vertical neighbors.

Figure 5A:
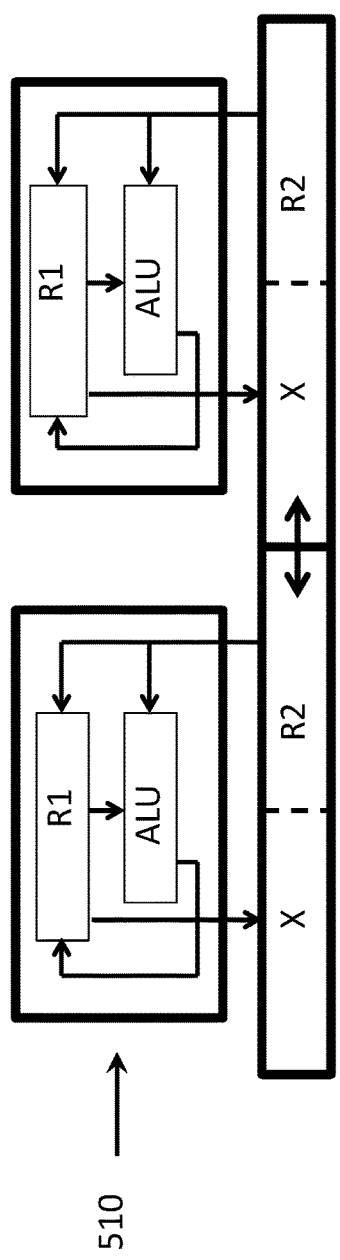
FIGS. 5a, 5b, 5c, 5d, 5e, 5f, 5g, 5h, 5i, 5j and 5k depict an example of the use of a two-dimensional shift array and an execution lane array to determine a pair of neighboring output pixel values with overlapping stencils.
Figure 5A:
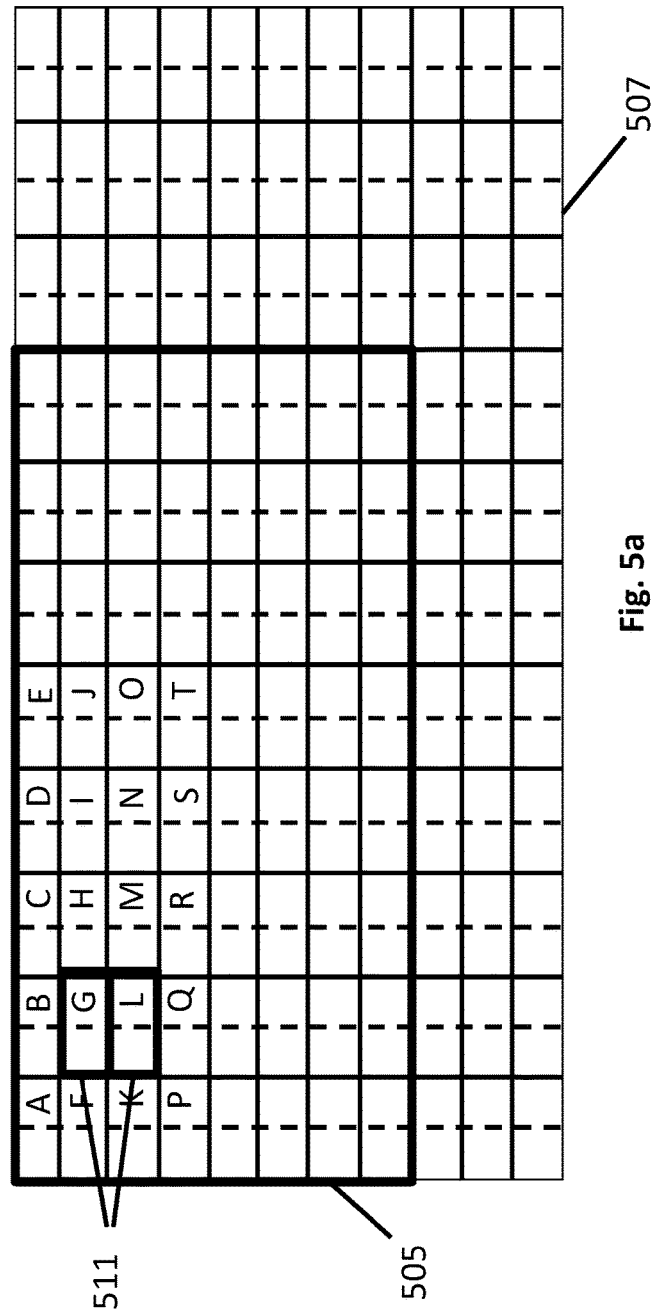
Figure 5B:
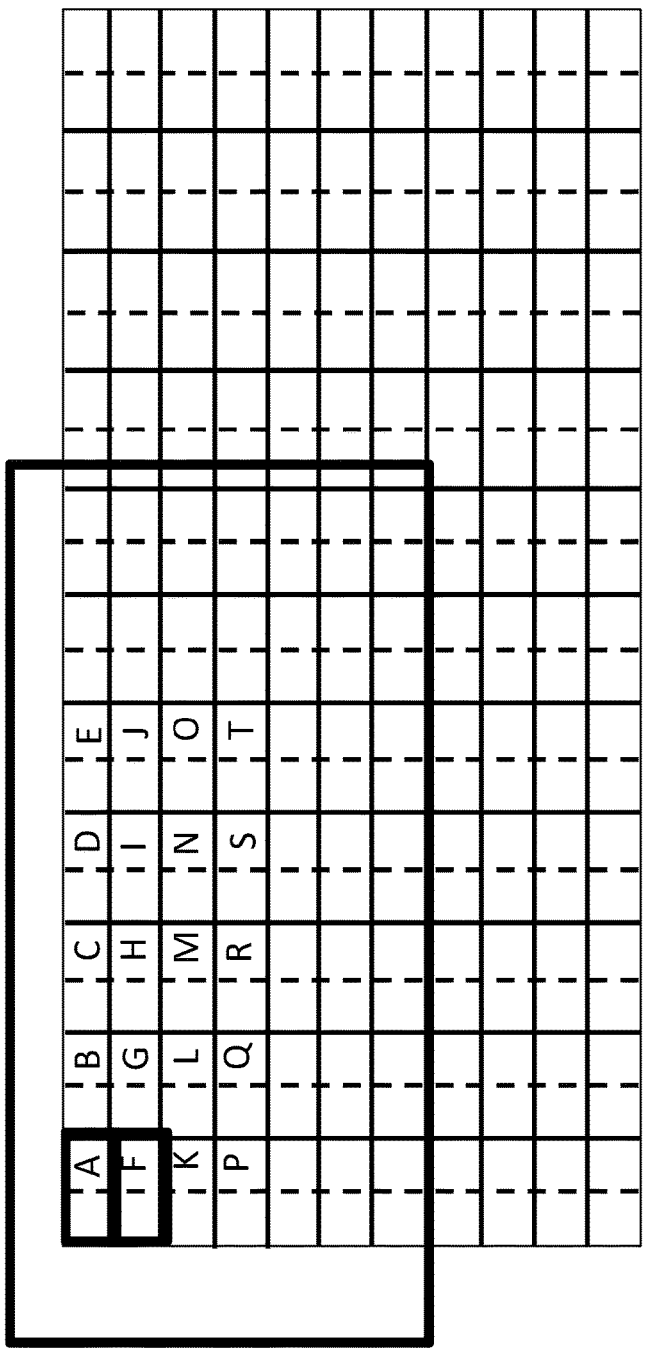

As observed initially in FIG. 5a, the execution lanes are centered on their central stencil locations. FIG. 5b shows the object code executed by both execution lanes. As observed in FIG. 5b the program code of both execution lanes causes the data within the shift register array to shift down one position and shift right one position. This aligns both execution lanes to the upper left hand corner of their respective stencils. The program code then causes the data that is located (in R2) in their respective locations to be loaded into R1.

Figure 5C:
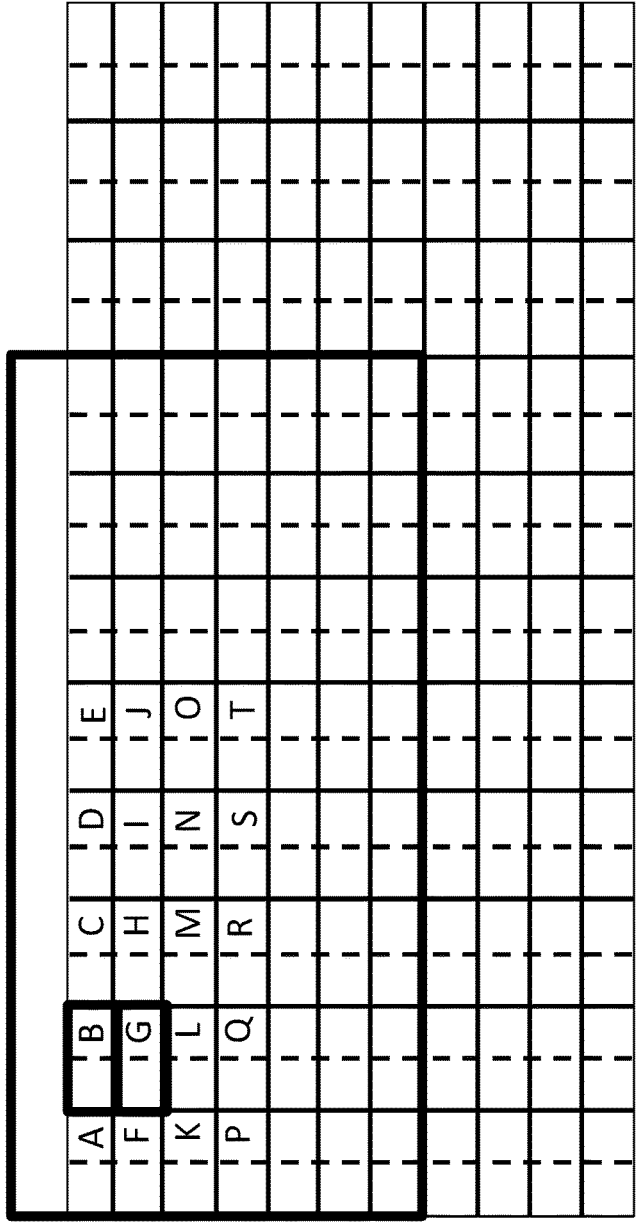
Figure 5D:
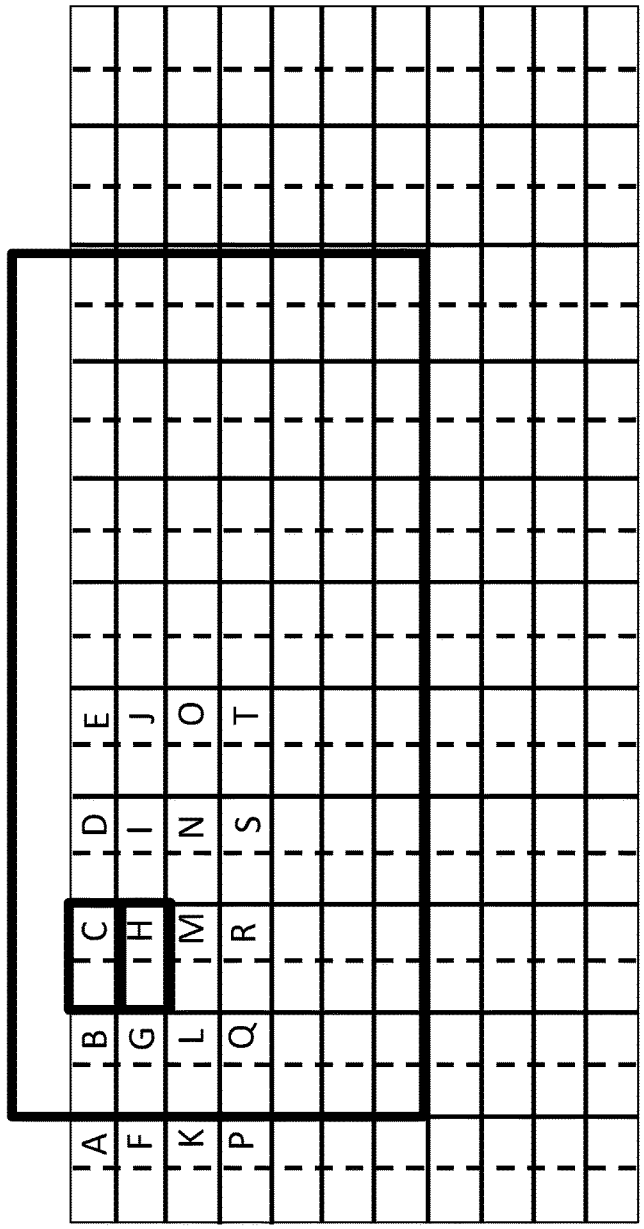

As observed in FIG. 5c the program code next causes the pair of execution lanes to shift the data within the shift register array one unit to the left which causes the value to the right of each execution lane's respective position to be shifted into each execution lane' position. The value in R1 (previous value) is then added with the new value that has shifted into the execution lane's position (in R2). The resultant is written into R1. As observed in FIG. 5d the same process as described above for FIG. 5c is repeated which causes the resultant R1 to now include the value A+B+C in the upper execution lane and F+G+H in the lower execution lane. At this point both execution lanes have processed the upper row of their respective stencils. Note the spill-over into a halo region on the left side of the execution lane array (if one exists on the left hand side) or into random access memory if a halo region does not exist on the left hand side of the execution lane array.

Figure 5E:
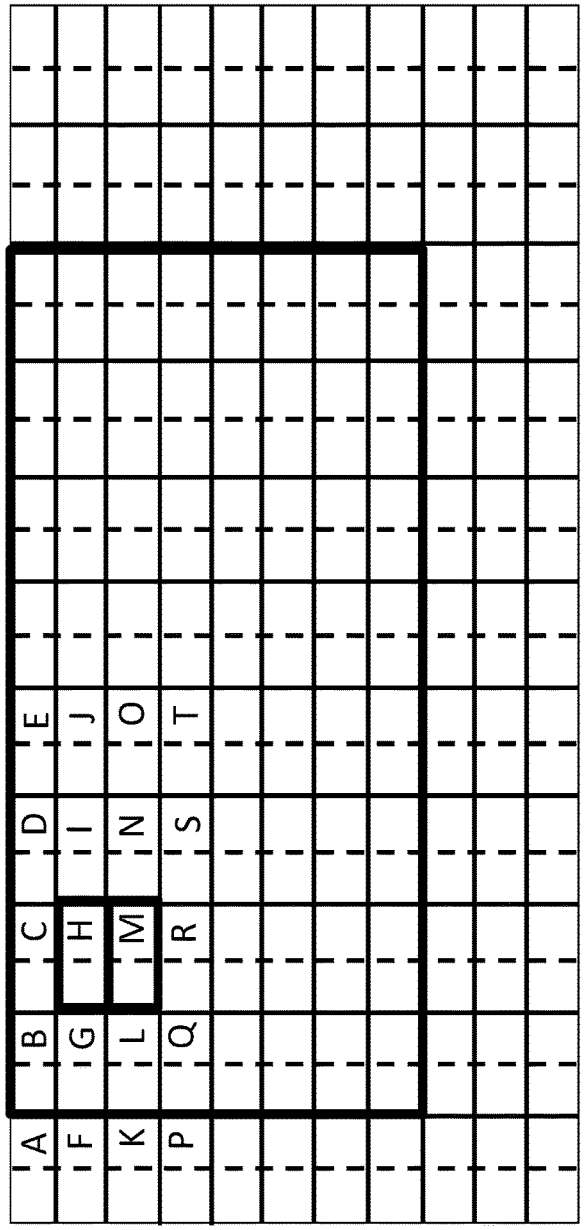
Figure 5F:
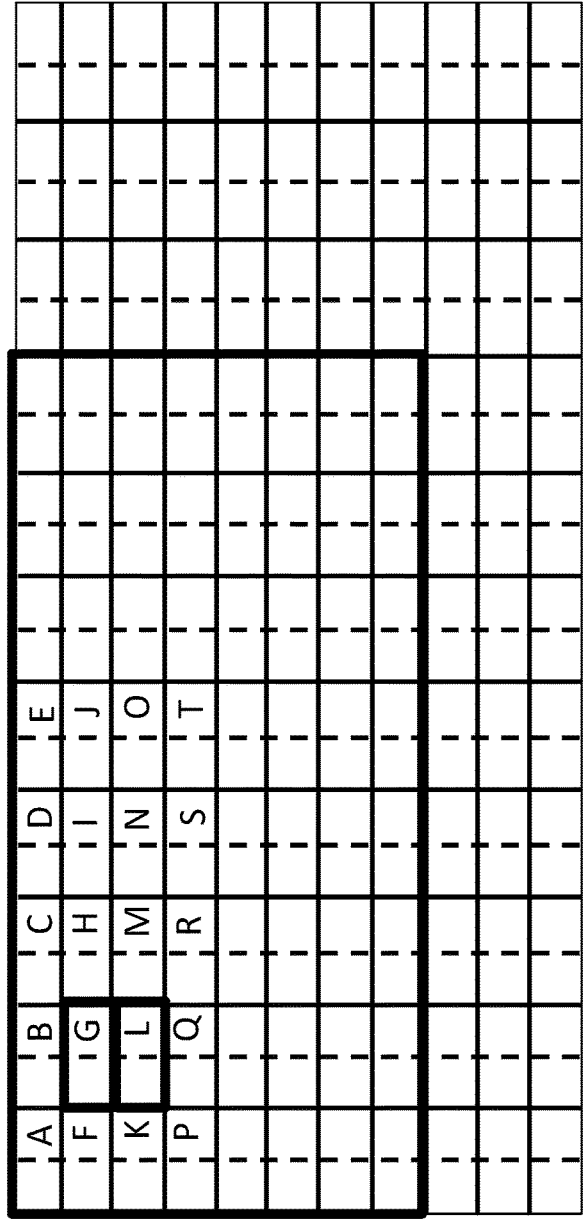
Figure 5G:
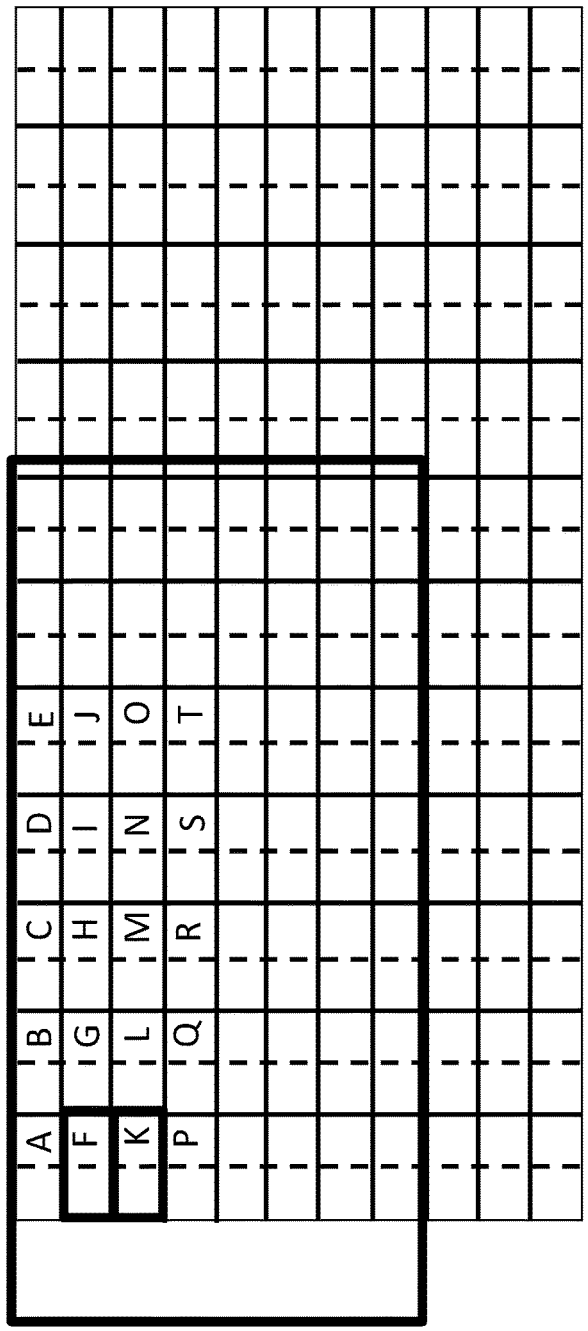

As observed in FIG. 5e, the program code next causes the data within the shift register array to shift one unit up which causes both execution lanes to be aligned with the right edge of the middle row of their respective stencils. Register R1 of both execution lanes currently includes the summation of the stencil's top row and the middle row's rightmost value. FIGS. 5f and 5g demonstrate continued progress moving leftwise across the middle row of both execution lane's stencils. The accumulative addition continues such that at the end of processing of FIG. 5g both execution lanes include the summation of the values of the top row and the middle row of their respective stencils.

Figure 5H:
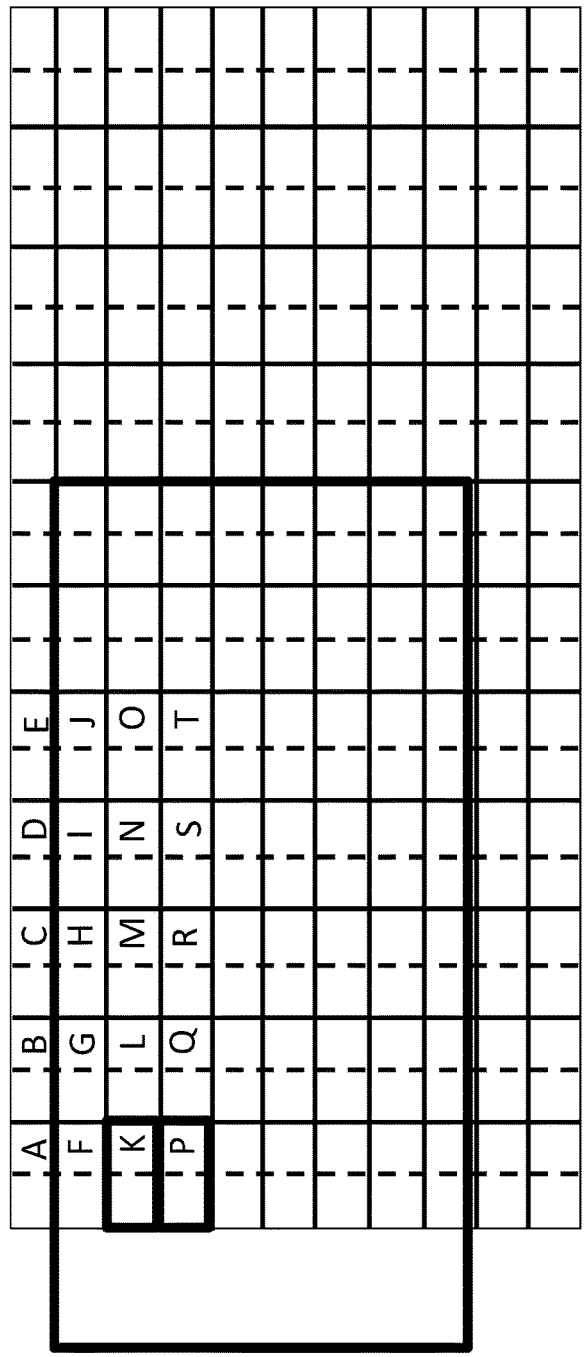
Figure 5I:
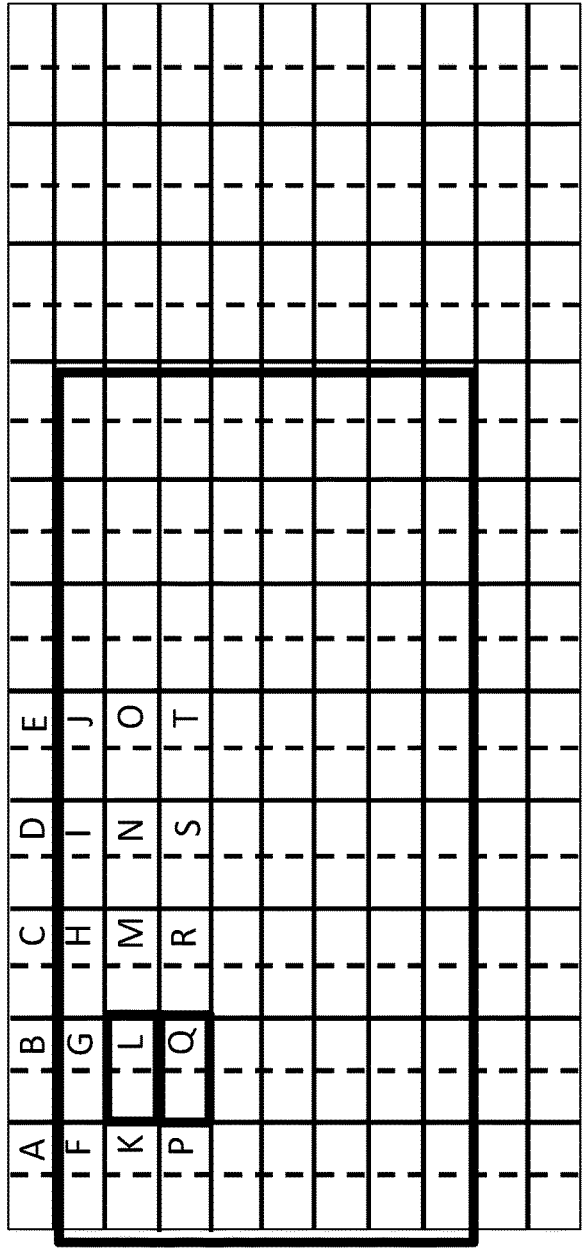
Figure 5J:
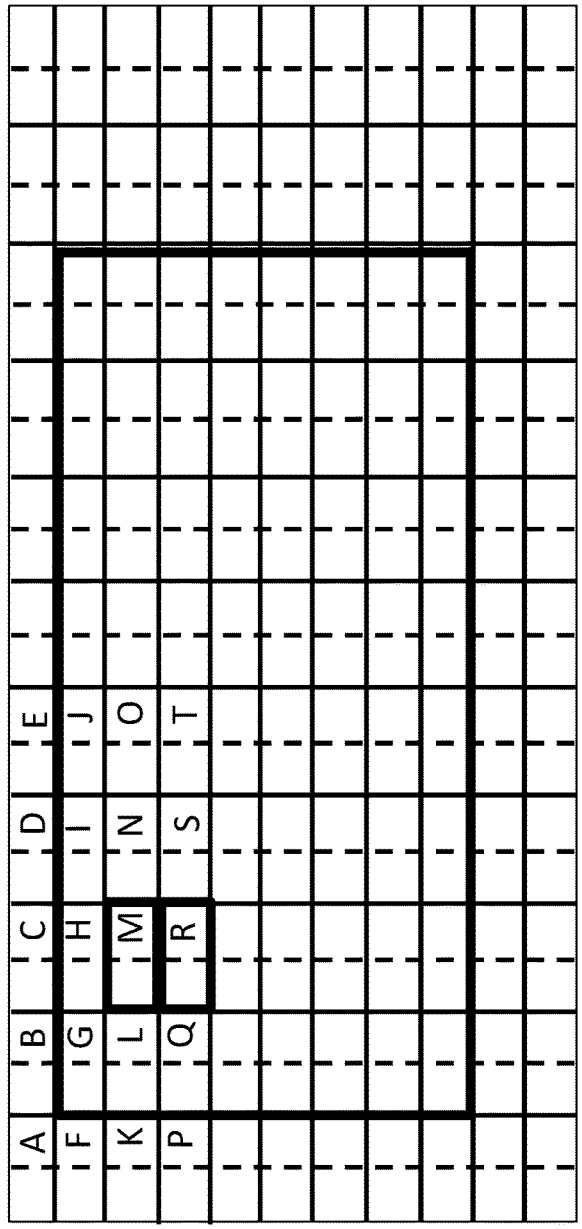
Figure 5K:
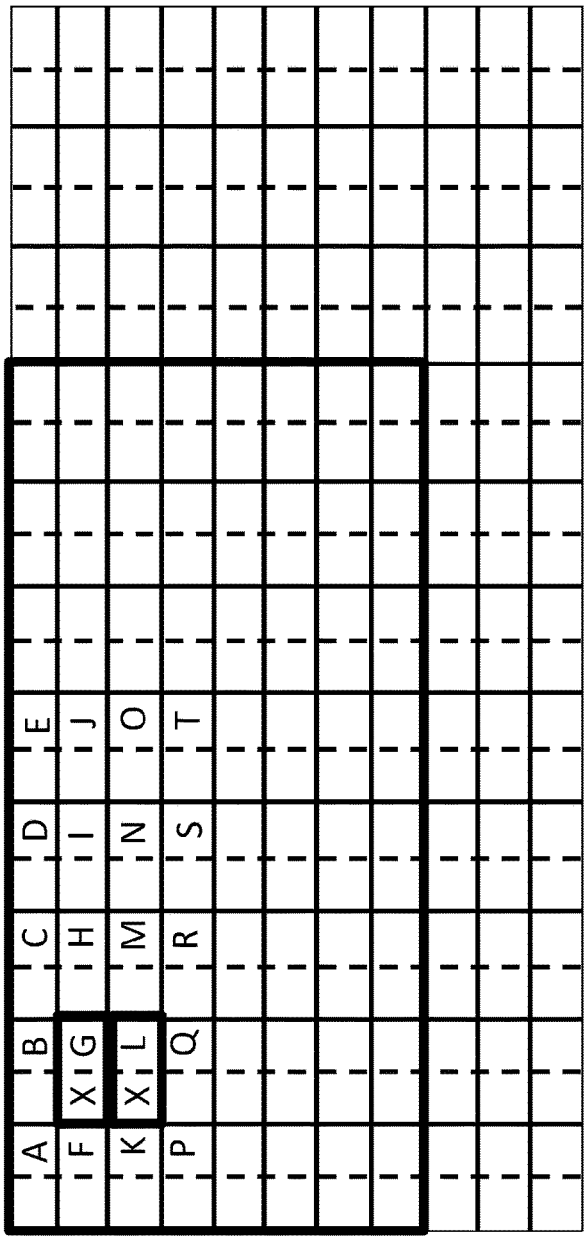

FIG. 5h shows another shift to align each execution lane with its corresponding stencil's lowest row. FIGS. 5i and 5j show continued shifting to complete processing over the course of both execution lanes' stencils. FIG. 5k shows additional shifting to align each execution lane with its correct position in the data array and write the resultant thereto.

In the example of FIGS. 5a-5k note that the object code for the shift operations may include an instruction format that identifies the direction and magnitude of the shift expressed in (X, Y) coordinates. For example, the object code for a shift up by one location may be expressed in object code as SHIFT 0, +1. As another example, a shift to the right by one location may expressed in object code as SHIFT +1, 0. In various embodiments shifts of larger magnitude may also be specified in object code (e.g., SHIFT 0, +2). Here, if the 2D shift register hardware only supports shifts by one location per cycle, the instruction may be interpreted by the machine to require multiple cycle execution, or, the 2D shift register hardware may be designed to support shifts by more than one location per cycle. Embodiments of the later are described in more detail further below.

Figure 6:
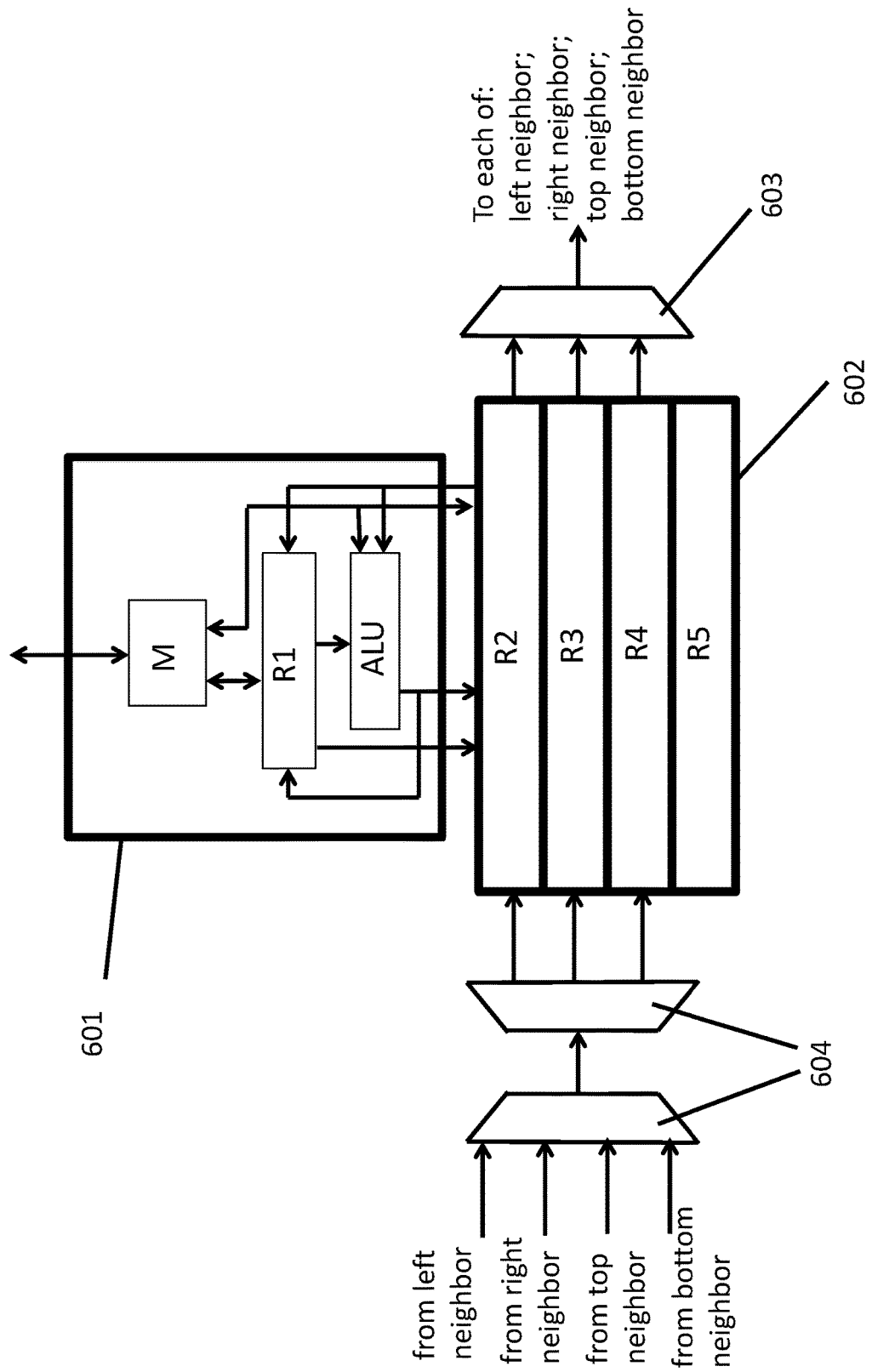
FIG. 6 shows an embodiment of a unit cell for an integrated execution lane array and two-dimensional shift array.

FIG. 6 shows another, more detailed depiction of the unit cell for the array execution lane and shift register structure (registers in the halo region do not include a corresponding execution lane). The execution lane and the register space associated with each location in the execution lane array is, in an embodiment, implemented by instantiating the circuitry observed in FIG. 6 at each node of the execution lane array. As observed in FIG. 6, the unit cell includes an execution lane 601 coupled to a register file 602 consisting of four registers R2 through R5. During any cycle, the execution lane 601 may read from or write to any of registers R1 through R5. For instructions requiring two input operands the execution lane may retrieve both of operands from any of R1 through R5.

In an embodiment, the two dimensional shift register structure is implemented by permitting, during a single cycle, the contents of any of (only) one of registers R2 through R4 to be shifted "out" to one of its neighbor's register files through output multiplexer 603, and, having the contents of any of (only) one of registers R2 through R4 replaced with content that is shifted "in" from a corresponding one if its neighbors through input multiplexers 604 such that shifts between neighbors are in a same direction (e.g., all execution lanes shift left, all execution lanes shift right, etc.). Although it may be common for a same register to have its contents shifted out and replaced with content that is shifted in on a same cycle, the multiplexer arrangement 603, 604 permits for different shift source and shift target registers within a same register file during a same cycle.

As depicted in FIG. 6 note that during a shift sequence an execution lane will shift content out from its register file 602 to each of its left, right, top and bottom neighbors. In conjunction with the same shift sequence, the execution lane will also shift content into its register file from a particular one of its left, right, top and bottom neighbors. Again, the shift out target and shift in source should be consistent with a same shift direction for all execution lanes (e.g., if the shift out is to the right neighbor, the shift in should be from the left neighbor).

Although in one embodiment the content of only one register is permitted to be shifted per execution lane per cycle, other embodiments may permit the content of more than one register to be shifted in/out. For example, the content of two registers may be shifted out/in during a same cycle if a second instance of the multiplexer circuitry 603, 604 observed in FIG. 6 is incorporated into the design of FIG. 6. Of course, in embodiments where the content of only one register is permitted to be shifted per cycle, shifts from multiple registers may take place between mathematical operations by consuming more clock cycles for shifts between mathematical operations (e.g., the contents of two registers may be shifted between math ops by consuming two shift ops between the math ops).

If less than all the content of an execution lane's register files are shifted out during a shift sequence note that the content of the non shifted out registers of each execution lane remain in place (do not shift). As such, any non shifted content that is not replaced with shifted in content persists local to the execution lane across the shifting cycle. The memory unit ("M") observed in each execution lane is used to load/store data from/to the random access memory space that is associated with the execution lane's row and/or column within the execution lane array. Here, the M unit acts as a standard M unit in that it is often used to load/store data that cannot be loaded/stored from/to the execution lane's own register space. In various embodiments, the primary operation of the M unit is to write data from a local register into memory, and, read data from memory and write it into a local register.

With respect to the ISA opcodes supported by the ALU unit of the hardware execution lane 601, in various embodiments, the mathematical opcodes supported by the hardware ALU are integrally tied with (e.g., substantially the same as) the mathematical opcodes supported by a virtual execution lane (e.g., ADD, SUB, MOV, MUL, MAD, ABS, DIV, SHL, SHR, MIN/MAX, SEL, AND, OR, XOR, NOT). As described just above, memory access instructions can be executed by the execution lane 601 to fetch/store data from/to their associated random access memory. Additionally the hardware execution lane 601 supports shift op instructions (right, left, up, down) to shift data within the two dimensional shift register structure. As described above, program control instructions are largely executed by the scalar processor of the stencil processor.

c. Configuration of Image Processor and Line Buffer Unit Operation

Figure 7:
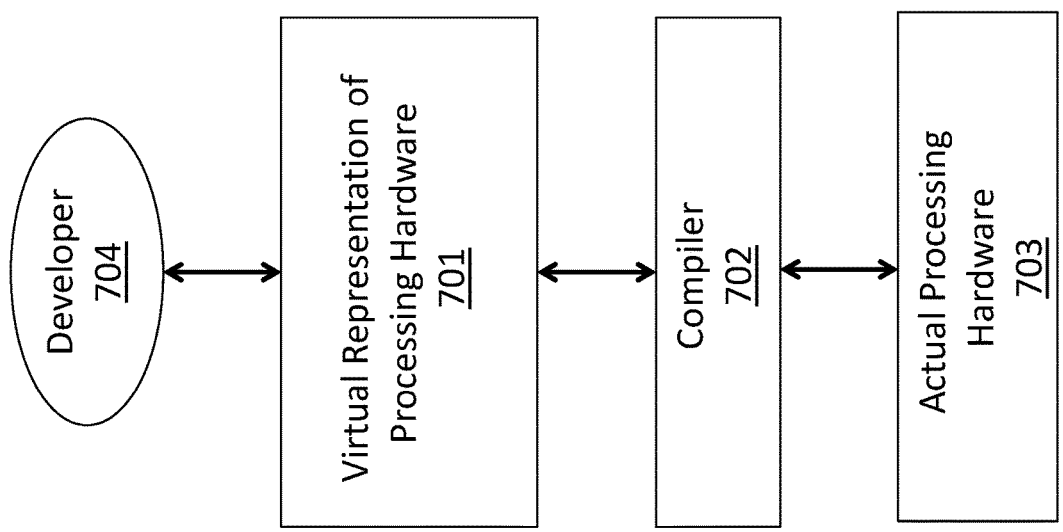
FIG. 7 shows a procedure for developing and implementing image processing program code.

FIG. 7 shows a high level view of an image processor technology platform that includes a virtual image processing environment 701, the actual image processing hardware 703 and a compiler 702 for translating higher level code written for the virtual processing environment 701 to object code that the actual hardware 703 physically executes. As described in more detail below, the virtual processing environment 701 is widely versatile in terms of the applications that can be developed and is tailored for easy visualization of an application's constituent processes. Upon completion of the program code development effort by the developer 704, the compiler 702 translates the code that was written within the virtual processing environment 701 into object code that is targeted for the actual hardware 703.

In various embodiments, program code that is written for the hardware platform is written with a unique virtual code that includes an instruction set having load and store instructions whose instruction format identifies input and output array locations as, e.g., X,Y coordinates. In various implementations, the X,Y coordinate information may actually be programmed into the hardware platform and recognized/understood by various ones of its components. This stands apart from, for example, translating the X,Y coordination (e.g., within the compiler) into different information. For example, in the case of the two-dimensional shift register structure within the stencil processor, the X,Y coordinate information is translated into register shift movements. By contrast, other parts of the hardware platform may specifically receive and comprehend the X,Y coordinate information originally expressed at the higher, virtual code level.

As observed in FIG. 8, a program code developer expresses data locations as X,Y coordinates with the special instruction format at the virtual code level 801. During the compilation stage, the virtual code is translated into program code that is actually processed by the hardware (object code) and corresponding configuration information that is loaded into the hardware's configuration (e.g., register) space. As observed in FIG. 8, in an embodiment, the object code for a particular kernel is loaded into the program space of the stencil processor's scalar processor 805.

As part of the configuration process, configuration software executing on the scalar processor 805 loads the appropriate configuration information 811, 812 into both the sheet generator unit 803 that is coupled to the stencil processor 802, and, the line buffer unit 801 that will generate new sheets for the stencil processor 802 to operate on, or, receive processed sheets generated by the stencil processor 802.

Here, generally, sheets can still be contemplated in terms of X,Y coordinates of an overall image. That is, once an image or frame is defined (e.g., in terms of number of pixels per row, number of rows, number of pixels per column and number of columns), any portion or position of the image can still be referred to with X,Y coordinates.

As such, in various embodiments, either or both of the sheet generator unit 803 and line buffer unit 801 are configured with information 811, 812 within their respective configuration space 806, 807 that establishes an informational platform from which specific locations and/or regions (e.g., line groups, sheets) of an image or frame are identified in X,Y coordinates. In various implementations/uses, the X,Y coordinates may be the same X,Y coordinates expressed at the virtual code level.

Examples of such information include, e.g., the number of active line groups in the line buffer unit, the image size for each line group (e.g., as a set of four X, Y coordinates (one for each corner) or a pair of X, Y coordinates (one for a lower nearer corner and one for an upper farther corner) or absolute image width and image height, stencil size (expressed as X, Y values that define the size of a single stencil and/or the area of the overlapping stencils of the stencil processor), sheet and/or line group size (e.g., specified in same terms as an image size but having smaller dimensions), etc. Additionally, the line buffer unit 701 at least may be programmed with additional configuration information such as the number of producer kernels writing and the number of consumer kernels reading the line groups that are managed by the line buffer unit 801. The number of channels and/or the dimensions associated with the image data are also typically included as configuration information.

FIG. 9a depicts the use of X,Y coordinates to define, as just one example, line groups within an image. Here, N line groups 901_1, 901_2, . . . 901_N are observable within an image 901. As can be seen from FIG. 9a, each line group can be readily defined by reference to X, Y coordinates within the image that define, e.g., one or more of a line group's corner points. As such, in various embodiments, a line group's name or other data structure used to define a particular line group may include X, Y coordinate locations associated with the line group in order to particularly identify it.

Referring briefly back to FIG. 8, note that FIG. 8 shows that during runtime, a sheet generator 803 may request a "next" line group (or portion of a line group) from the line buffer unit 801 by, e.g., including X, Y coordinate information that defines the desired data region. FIG. 9a shows nominal "full width" line groups composed only of complete rows of image data. In an alternative configuration referred to as "virtually-tall", the line buffer unit 801 initially passes only a first upper portion of a line group as full width rows of image data. The subsequent lower rows of the line group are then specifically requested for by the sheet generator in contiguous chunks that are less than a full width row and are separately requested for. As such, multiple requests are made by the sheet generator in order to obtain the full line group. Here, each such request may define a next portion by X, Y coordinates that are attributable to the next portion.

As observed in FIG. 9b, a line buffer unit includes memory 901 in which line groups 902_1 through 902_N are stored (e.g., static or dynamic random access memory (SRAM or DRAM)). The memory 901 may be implemented on chip along with the same circuitry that implements the line buffer unit (and, e.g., the sheet generators and stencil processors), or, off chip. FIG. 9b shows the activity between the various kernels that produce and consume the line groups 902_1 through 902_N for a particular image/frame within the memory 901.

As observed in FIG. 9b, a producer kernel K1 sends new line groups to the line buffer unit 901 for storage in memory 901 over separate time instances P1, P2 through PN. The producer kernel K1 executes on a stencil processor that generates new sheets of data. The sheet generator that is coupled to the stencil processor accumulates sheets to form line groups and forwards the line groups to the line buffer unit which stores them in memory.

Also as depicted in FIG. 9b, there are two consumer kernels K2, K3 that operate on the line groups 902_1 through 902_N generated by producer kernel K1. Here, consumer kernels K2 and K3 receive the first line group 902_1 at times C21 and C31, respectively. Obviously, times C21 and C31 occur after time P1. Other restrictions may not exist. For example, times C21 and/or C31 may occur before or after any of times P2 through PN. Here, the respective sheet generators for kernels K2 and K3 request a next line group at a time that is appropriate for their respective kernel. If any of kernels K2, K3 request line group 902_1 before time P1, the request idles until after line group 902_1 is actually written into memory 901.

Conceivably, requests from either or both of kernels K2 and K3 for all of line groups 902_1 through 902_N may arrive prior to time P1. Thus, line groups may be requested by consumer kernels at any time. The line groups are forwarded to the consumer kernels as they request them subject, however, to the rate at which the producer kernel K1 can produce them. In various embodiments, consumer kernels request line groups in sequence and likewise receive them in sequence (kernel K2 receives line groups 902_2 through 902_N at times C22 through C2N in sequence). For simplicity only one producer kernel is depicted for a particular line group. It is conceivable that various embodiments may be designed to permit different producers to write to a same line group (e.g., where consumers are not permitted to be serviced until after all producers have written to the line group).

In cases where there is no producer kernel (because the consumer kernel(s) is/are the first kernels in the processor's DAG processing flow), frames of image data may be transferred into memory 901 (e.g., via direct memory access (DMA) or from a camera) and parsed into line groups. In cases where there are no consumer kernel(s) (because the producer kernel is the last kernel in the processor's overall program flow), resultant line groups may be combined to form output frames.

d. Application and Structure of Kernels

FIG. 10a shows an example of the structure and form that application software written within the virtual environment may take. As observed in FIG. 10a, the program code may be expected to process one or more frames of input image data 1001 to effect some overall transformation on the input image data 1001. The transformation is realized with the operation of one or more kernels of program code 1002 that operate on the input image data in an orchestrated sequence articulated by the developer.

For example, as observed in FIG. 10a, the overall transformation is effected by first processing each input image with a first kernel K1. The output images produced by kernel K1 are then operated on by kernel K2. Each of the output images produced by kernel K2 are then operated on by kernel K3_1 or K3_2. The output images produced by kernel(s) K3_1/K3_2 are then operated on by kernel K4. Kernels K3_1 and K3_2 may be identical kernels designed to speed-up the overall processing by imposing parallel processing at the K3 stage, or, may be different kernels (e.g., kernel K3_1 operates on input images of a first specific type and kernel K3_2 operates on input images of a second, different type).

As such, the larger overall image processing sequence may take the form of an image processing pipeline or a directed acyclic graph (DAG) and the development environment may be equipped to actually present the developer with a representation of the program code being developed as such (here, a pipeline is understood to be a form of a DAG). Kernels may be developed by a developer individually and/or may be provided by an entity that supplies any underlying technology (such as the actual signal processor hardware and/or a design thereof) and/or by a third party (e.g., a vendor of kernel software written for the development environment). As such, it is expected that a nominal development environment will include a "library" of kernels that developers are free to "hook-up" in various ways to affect the overall flow of their larger development effort. Some basic kernels that are expected to be part of such a library may include kernels to provide any one or more of the following basic image processing tasks: convolutions, denoising, color space conversions, edge and corner detection, sharpening, white balance, gamma correction, tone mapping, matrix multiply, image registration, pyramid construction, wavelet transformation, block-wise discrete cosine and Fourier transformations.

As discussed above, in various embodiments, each kernel runs on its own stencil processor. For example, referring to FIG. 10a, kernel K1 runs on a first stencil processor, kernel K2 runs on a second stencil processor, etc. Additionally, as discussed above, producing and consuming kernels interface through line buffer units.

FIG. 10b depicts how the image processor could be configured to implement the DAG flow of FIG. 10a. As observed in FIG. 10b line buffer unit 1001_1 (LBU_1) receives the input image stream and parses the received frames into line groups. The switching network is configured to route line groups from LBU_1 to a first stencil processor 1002_1 upon which kernel K1 executes. Output images from kernel K1 are formatted into line groups and forwarded to a second line buffer unit 1001_2 (LBU_2). These line groups are then forwarded to a second stencil processor upon which kernel K2 executes.

From FIG. 10a, image information can be "split" from kernel K2 into either of kernels K3_1 or K3_2. Here, for instance, kernels K3_1 and K3_2 may process different channels associated with the overall image being processed. For example, kernel K3_1 may process red (R) images while kernel K3_2 may process green (G) and blue (B) images. Alternatively, K3_1 may process visual images while kernel K3_2 may process depth images (e.g., taken from a time-of-flight depth imaging camera along with the visual images). Regardless, all channels of the image are processed by kernels K1 and K2 but different channels of the image are processed with different kernels K3_1 and K3_2. Further still, kernels K3_1 and K3_2 may be separate instances of the same (e.g., extremely numerically intensive) program code and two stencil processors are used to speed-up the processing of the K3 function by executing it in parallel.

Regardless, the aforementioned "split" causes some line group image information from kernel K2 to be buffered into a third line buffer unit 1001_3 (LBU_3) and other line group image information from kernel K2 to be buffered into a fourth line buffer unit 1001_4 (LBU_4). The line groups that are buffered in the LBU_3 line buffer unit are forwarded to a third stencil processor 1002_3 on which kernel K3_1 executes. The line groups that are buffered in the LBU_4 line buffer unit are forwarded to a fourth stencil processor 1002_4 on which kernel K3_2 executes. Output line groups from kernels K3_1 and K3_2 are respectively buffered in fifth and sixth line buffer units 1001_4 (LBU_5), 1001_5 (LBU_6). The line groups from the LBU_5 and LBU_6 line buffer units are then passed to a fifth stencil processor 1002_5 that executes kernel K4. Note that the split line groups merge again at the fifth stencil processor 1002_5.

FIGS. 11a and 11b pertain to a more straightforward pipelined approach where each stencil processor receives a line group from an immediately preceding stage and provides a for an immediately following stage. Specifically, line buffer units 1101_1 (LBU_1), 1101_2 (LBU_2), 1101_3 (LBU_3), 1101_4 (LBU_4) respectively feed stencil processors 1102_1, 1102_2, 1102_3, 1102_4 that respectively execute kernels K1, K2, K3 and K4. Stencil processors 1102_1, 1102_2, 1102_3, 1102_4 also respectively feed line buffer units 1101_2 (LBU_2), 1101_3 (LBU_3), 1101_4 (LBU_4), 1101_5 (LBU_5).

FIG. 11c shows another pipelined approach that essentially executes two pipelines in parallel (K1-K3-...) and (K2-K4-...). This configuration can be used to speed up a pipeline through parallel execution (e.g., kernels K1 and K2 are the same, and, kernels K3 and K4 are the same), or, two different pipelines are used depending on image data context (e.g., one pipeline processes one kind of channel and the other pipeline processes the other kind of channel).

In each of FIGS. 11a, 11b and 11c note the different configurations that will need to be made to the connection network 1004/1104 to connect the stencil processors to the source and sink line groups in the appropriate manner.

In various embodiments, the image processor includes appropriate configuration space (e.g., implemented with configuration registers and/or random access memory (such as the scalar processor's scalar memory)) in which to keep configuration information to implement any of a myriad of various configurations (e.g., DAG, image processing pipeline). Some exemplary configuration parameters include: 1) Number of Source Images (the number of source image frames that are streamed into the system, from e.g., either a camera or a larger computer system's main memory); 2) Number of Line groups (the total number of line groups configured for within the line buffer units in the system); 3) Number of Active Stencil Processors (the total number of active stencil processors in the system); 4) Number of Input Line Groups Per Stencil Processor (one stencil processor can handle more than one input image frame, Num_Input_LGs_perStencil essentially indicates how many different input image frames the stencil processor will handle); 5) Number of Output Line Groups Per Stencil Processor (one stencil processor can handle more than one output image frame, Num_Output_LGs_perStencil essentially indicates how many different output image frames the stencil processor will handle); 6) Number of Consumers Per Line Group (for each line group configured for in each line buffer unit, Num_Cons_per_LG indicates how many consumers the line group has). Other types of configuration information may be accepted by the system based on any of the features, structures or operations of the system described above.

e. Automated DAG/Pipeline Code Restructuring Processes

With the aforementioned basic principles of image processor configuration and operation being described in the preceding sections, the present section describes certain restructuring processes that a compiler may perform to a DAG of kernels to effect more efficient overall implementation of the DAG. As alluded to above, a pipeline is understood to be a form of DAG.

Here, the compiler may be programmed to recognize certain inefficient or otherwise problematic DAG structures and automatically re-structure the DAG to reduce the inefficiency and/or eliminate the problem. In various embodiments, a software program development tool may permit a program developer to provide hints that a compiler can use to perform one or more transformations to the program code, described further below, to address the inefficiencies.

Examples of inefficiencies or problems in a DAG that may be detected and responded to by the compiler include (but are not limited to): 1) a kernel that is particularly more computationally complex as compared to other kernels in the DAG; 2) a DAG that contains more or fewer kernels than stencil processors in the image processor; 3) limited line buffer unit memory space and/or limited instruction memory space. FIGS. 12a/b/c through FIG. 16 describe some of the possible restructurings that a compiler may be designed to implement in response to these inefficiencies/problems.

FIGS. 12a and 12b are directed to "horizontal fusion" code restructuring. In the case of horizontal fusion, as observed in FIG. 12a multiple kernels of a DAG, e.g., that each flow from a same kernel, are merged into a single kernel. Here, FIG. 12a shows an original code sequence 1201 having separate K2 and K3 kernels. After restructuring by the compiler, a new code sequence 1202 is created in which kernels K2 and K3 are combined into a single kernel K2/K3.

Horizontal fusion may be performed by a compiler in response to, e.g., the existence of smaller kernels in the DAG/pipeline as compared to other kernels. Here, the fusion of the kernels will produce a larger kernel that is more comparable in size/computational intensity to the other kernels. Alternatively or in combination the compiler may perform horizontal fusion in response to there being more kernels in the original DAG than stencil processors. Here, the fusion will reduce the total number of kernels in the DAG (ideally, so as to no longer exceed the number of stencil processors in the image processor).

In various embodiments, horizontal fusion merges the program code of multiple kernels that are independent of one another (e.g., of two kernels being merged, a first kernel does not accept as an input information generated by a second kernel). Additionally, horizontally fused kernels may accept input information from a same kernel and/or provide output information that is consumed by a same kernel. The former is illustrated in FIG. 12a where fused kernels K2 and K3 both accept input information from kernel K1.

FIG. 12b shows an embodiment of the implementation of horizontal fusion. Here, the newly constructed K2/K3 kernel is designed as a concatenation of the kernels being fused. That is, in the embodiment of FIG. 12b, new kernel K2/K3 is composed of the program code for kernel K3 which begins execution just after the program code for kernel K2 executes 1203. Notably, new kernel K2/K3 accepts the same input information as the combination of kernels K2 and K3 and provides the same output information as the combination of kernels K2 and K3. Again, the inputs may be received from same or different line buffer units and the outputs may provide their respective outputs to same or different line buffer units.

Here, referring to FIG. 12a if kernel K1 generates line buffer data for two different line buffer units (a first line buffer unit that feeds K2 and a second line buffer unit that feeds K3) no change in the program flow is needed (the K2 portion of kernel K2/K3 reads from the line buffer unit that produces for K2, and, the K3 portion of kernel K2/K3 reads from the line buffer that produces for K3). If both kernels K2 and K3 are consumers of the same data from kernel K1 (i.e., kernel K1 only writes to one line buffer unit and both K2 and K3 read from that line buffer unit), again no change in the program's data flow is needed. In this case both the K2 and K3 portions of kernel K2/K3 consume from the same line buffer unit. A similar analogy applies for the output line buffer unit(s) of kernel K2/K3.

In various embodiments the compiler should be conscious of the spatial rates (pixels processed per kernel invocation) that fused kernels operate according to. Here, the kernels being fused may not necessarily operate at the same rate as originally written. For example, owing to differences in image resolution, they may not consume the same number of cycles in performing their respective algorithms. For instance, a down sampling kernel may have to operate over a wider image area requiring more two-dimensional shift register shift operations than another kernel that does not down sample.

As a consequence the down sampling kernel consumes more invocations before it completes than the kernel that does not down sample. For instance the down sampling kernel may consume 16 cycles before it completes while the non down sampling kernel may only consume 4 cycles before it completes. The difference in completion rates can cause timing problems with the line buffer unit which expects cycles per completion to be constant over the run length of an entire kernel. The compiler therefore modifies the code of the kernel(s) so that they consume approximately a same number of cycles to fully execute their respective algorithms. By so-doing, the line buffer is spared having to adjust to a dramatically different kernel algorithm completion rate during mid-kernel execution.

Therefore, in an embodiment, the compiler adds one or more loops to a kernel that consumes fewer cycles per completion to cause the kernel to, e.g., consume a same number of cycles per completion as a kernel that consumes more cycles per completion. For instance, in the aforementioned example, the non-downsampling kernel will be modified to run through four loops of its algorithm before it completes. Although four times the data is created by the modified kernel as compared to its original version for one execution run, the modified kernel will consume 16 cycles before it completes which is the same as the downsampling kernel. Conceivably the compiler may modify the rates of more than one kernel to reach a common dominator of cycles that all kernels can match rates to.

FIGS. 13a through 13c pertain to vertical fusion. In the case of vertical fusion, as observed in FIG. 13a, a producer/consumer relationship exists between kernels being fused. For example, as observed in FIG. 13a, kernel K1 is a producer for kernel K2 (kernel K2 is a consumer of kernel K1). After restructuring by the kernel, a new kernel K1/K2 is generated that performs the function of fused kernels K1 and K2.

FIG. 13b shows the construction of the new kernel. Here, the consuming kernel K2 is concatenated after kernel K1 to effect the correct producer/consumer relationship. The input for new kernel K1/K2 corresponds to the input for kernel K1 and the output of new kernel K1/K2 corresponds to the output of kernel K2. The compiler may decide to impose vertical fusion, e.g., in response to the kernels being fused being less computationally complex than other kernels in the DAG and/or there being more kernels in the DAG than stencil processors within the image processor.

An issue may arise in the case of vertical fusion if a consuming kernel portion of a vertically fused kernel needs the halo region to perform its task(s). Recall from the discussion of FIG. 4 above that in various embodiments the dimensions of the two dimensional shift register within a stencil processor may accommodate a halo region 409 that extends outside the area where output pixel values are stored.

Here, if the consuming kernel portion of a vertically fused kernel needs content in the halo region it cannot immediately operate on the output of the producing kernel portion. That is, the output data generated by a producer will keep "beneath" the execution lanes and will not extend into the halo region. If the consuming kernel portion needs image data in the halo region, the halo data will not be available if the consuming kernel portion begins operation on an output resultant from the producer portion immediately after it is generated.

A solution is to delay the start of the consuming kernel portion to ensure that the halo region data has been generated by the producer kernel portion by the time the consuming kernel begins operation. FIG. 13c shows an exemplary depiction of the solution. Here, bordered region 1301 corresponds to the execution lane area of the producer kernel portion and bordered region 1302 corresponds to the halo region that resides outside the producer kernel portion's execution lane area 1301.

By contrast, bordered region 1303 corresponds to the execution lane area that the consuming kernel portion is operating on after the producer kernel portion has generated the output within region 1301. Bordered region 1304 corresponds to the halo region that resides around the execution lane area 1303 of the consumer kernel portion. FIG. 13c assumes stencil processing operates on sheets in a left to right fashion along a same row of sheets until processing for the row of sheets is complete at which time processing will commence for the next row of sheets.

The offset or phase difference that exists between regions 1301 and 1303 can be deliberately imposed by delaying the start of the consuming kernel portion until output is produced by the producing kernel portion that is available to the consuming kernel portion and has the relative positioning offset observed in FIG. 13c. Notably, with this offset, the image data output that has been generated by the producer kernel and is available to the consuming kernel portion "fills" not only the execution lane area 1303 of the consuming kernel portion but also its halo region 1304 as well. As such, the consuming kernel portion has the data it needs to properly calculate output values for region 1303 and concatenated operation of K1 followed by K2 before a next run of K1 is attempted is permissible.

In a nominal embodiment, a producer kernel writes its output data to a line buffer unit and the consuming kernel reads the data from the same line buffer unit. However, as a consequence of the producing and consuming kernel portions now being fused and executed on the same stencil processor, output data generated by the producing kernel portion may remain local to the stencil processor (e.g., within stencil processor RAM 407 and/or sheet generator memory) rather than being written back to the line buffer unit. As such, rather than read data from a line buffer unit, the consuming kernel portion instead reads the output data from the memory that is local to the stencil processor.

Thus, entire write/read sequences between a stencil processor and a line buffer unit can be avoided. In embodiments where there are other consumers of the producing kernel portion's output that were not fused with the producing kernel portion, the producing kernel portion's output is externally written to a line buffer unit so the external consuming kernels can receive the producer's data.

FIG. 13c also show that, for similar reasons, the dimensions of the image data that are actually processed by the stencil processor exceed the dimensions of the image being processed. Specifically, additional spatial regions 1305, 1306 are processed over by the producer kernel portion so that the producer kernel portion can generate halo data needed by the consumer kernel portion.

FIG. 14 depicts another restricting that may be referred to as a "fission split". In the case of a fission split, a larger kernel is broken down into multiple smaller kernels. For example, as observed in FIG. 14, a large initial kernel K having sub-graphs A through F is broken down into two kernels K1 and K2 where new kernel K1 includes sub-graphs A through D and new kernel K2 contains sub graphs E and F. A fission split may be imposed by a compiler, e.g., if the kernel being split K is more computationally intense than the other kernels in the DAG and/or its instruction footprint is too large to fit into stencil processor instruction memory.

As part of the restructuring, note that "store_sheet" commands/instructions and "load_sheet" commands/instructions are newly inserted into the overall code at the juncture where the larger kernel code was split. Specifically, observing from the example of FIG. 14 that the larger kernel K is split at juncture 1401, note that the output of sub graph D is modified to store a sheet of information and the input of sub graph E is modified to load a sheet of information.

As discussed at length above, owing to the existence of the two-dimensional shift register array within a stencil processor, a sheet of image data is the basic input data structure and output data structure for a kernel. As such, before a kernel can operate on a sheet of data it must first load the sheet of data into the two-dimensional register space of the stencil processor. Likewise, when a kernel has finished one execution of its core algorithm it writes its output sheet of data from the two dimensional shift register into stencil processor RAM and/or sheet generator RAM.

Consistent with these basic data structure requirements, part of imposing a fission split is a newly created kernel output (output of sub graph D in FIG. 14) and a newly created kernel input (input of sub graph E in FIG. 14). The former requires a store sheet command to write a sheet of output data from the two-dimensional shift register array while the former requires a load sheet command to read a sheet of input data into the two-dimensional shift register array. Note that the Store_Sheet and Load_Sheet commands also correspond to communication between a kernel and a line buffer unit (line buffers are composed of multiple sheets). As such whereas before fission sub graph D did not directly feed a line buffer unit, after fission it does. Likewise, whereas before fission sub graph E did not directly receive from a line buffer unit, after fusion it will.

In an embodiment, the compiler is designed to impose the split juncture 1401 in a region or the larger kernel K such that the newly created separate kernels K1, K2 will be approximately equal in size/computational intensity. In some instances this may cause the compiler to impose the split juncture 1401 through an iterative loop. For example, sub graphs D and E may implement a loop where program flow flows from sub graph E back to sub graph D until the loop completes.

In the case where the split juncture 1401 cuts through a loop, the compiler additionally modifies program code so that the loop itself is split. Here, note that the fission split 1401 observed in FIG. 14 essentially creates new kernels having a producer/consumer relationship. That is, newly created kernel K2 reads line buffers created by kernel K1 from a line buffer unit that kernel K1 writes it output line buffers into. As such, the leading iterations of the loop are performed by K1 and the trailing iterations of the loop are performed by K2.

In another embodiment, the compiler does not attempt to split loops that have a data dependency between previous iterations and next iterations and instead keeps the entirety of a loop within a same kernel. As such, the presence of loops can affect where the compiler chooses to impose the split juncture 1401 (around them instead of through them).

FIG. 15 depicts another compiler restructuring process referred to as "spatial partitioning". As observed in FIG. 15, spatial partitioning entails duplicating a kernel that was originally designed to operate on a larger image into multiple kernels of same core algorithm that are designed to operate on only a portion of the image.

Here, in the exemplary depiction of FIG. 15, original kernel K1 is designed to operate on entire image 1501. The compiler essentially duplicates kernel K1 so that the DAG includes two instances of K1's code K1_1 and K1_2. The compiler further modifies the base K1 code of the newly created kernels to only refer to the portion of the image that they are supposed to process. In the example of FIG. 15, kernel K1_1 only operates on the left half 1501_1 of image 1501 and kernel K1_2 only operates on the right half 1501_2 of image 1501.

As such, the compiler will reconstruct the kernel code of kernel K1_1 to only request line buffer data that resides within the left half 1501_1 of image 1501 and will reconstruct the code of kernel K1_2 to only request line buffer data that resides within the right half 1501_2 of image 1501. Recalling that kernel software can request a line buffer by referring to it by its X, Y coordinates, in various embodiments the compiler's reconstructions of kernels K1 and K2 entail reformatting the line buffer requests to specify coordinates that correspond to the portion of the image that the kernel is supposed to process.

For example, kernel K1_1 will avoid requesting coordinates that span across the width of the entire image and instead request a next lower row of image data once the input line buffer data has been received that is sufficient to process the left half 1501_1 of the image. Likewise, when starting a next lower row of line buffer data to process, kernel K1_2 will have an X axis offset that corresponds to half the image (e.g., instead of asking for a next lower line buffer at coordinate 0,Y the kernel will request a next lower line buffer at coordinate W/2,Y where W is the width of the entire image 1501 along the X axis).

Other image partition arrangements are possible according to the aforementioned principles of tweaking the coordinate values of the requested line buffer data.

In a typical embodiment, the original kernel K1 was designed to read the entire image from a single line buffer unit and write its output data into another single line buffer unit. After the spatial partitioning, both of kernels K1_1 and K1_2 may refer to the single source line buffer unit where the image data resides (or the producer kernel of the input image for kernels K1_1, K1_2 may be reconfigured to write two copies of the image in two separate line buffer units that kernels K1_1 and K1_2 read from separately). As observed in FIG. 15, however, in an embodiment, each of kernels K1_1 and K1_2 write their output data to two separate line buffer units LB_1 and LB_2.

In an embodiment this restriction is imposed because, as mentioned above with respect to FIGS. 9a and 9b, a line buffer unit can serve multiple consumers but can only handle one producer. A such, a single line buffer unit cannot handle the output from both of kernels K1_1 and K1_2 (each kernel must write to its own line buffer unit). Thus, as observed in FIG. 15, consuming kernel K2 is also reconfigured as part of the spatial partitioning restructure to read the image data it desires for the two different halves of the image from two different line buffer units (LB_1 keeps left hand side image data and LB_2 keeps right hand side image data). That is, kernel K2 is restructured to issue a request to LB_1 if it desires left hand side image and issue a request to LB_2 if it desires right hand side image data. K2 may also be restructured to merge image halves into a single image if, e.g., the algorithm of K2 operates on a whole image.

FIG. 16 pertains to another code restructuring process referred to as "graph splitting". In the case of graph splitting, the amount of data that is processed by the DAG exceeds the internal memory requirements of the image processor. As such, the DAG has to be split into multiple DAGs each of which process an amount of data that is within the internal storage space limits of the image processor. Here, in various embodiments, the line buffer units, the sheet generators and the stencil processors each have associated memory. If the storage requirements of a single DAG exceed the capacity of one or more of these memories, multiple DAGs are created.

An example is observed in FIG. 16 in which a DAG 1608 is created whose purpose is to repeatedly down sample a very large input image 1601 into a much smaller lower density output image 1607. The DAG/pipeline 1608 is composed of six kernels K1 through K6 each of which down sample a larger input image into a smaller output image (e.g., kernel K1 down samples larger input image 1601 into smaller image 1602, kernel K2 down samples image 1602 into smaller image 1603, kernel K3 down samples image 1603 into smaller image 1604, etc.

In an implementation where, e.g., the initial input image 1601 is extremely large it may not be possible to fit all the data/instructions/context into the internal memory space of the image processor. As such, in response, the compiler will analyze the memory resource demands of kernels K1 through K6 and parse the initial larger DAG/pipeline 1608 into a group of smaller DAGs/pipelines 1609, 1610, 1611 that are to operate in sequence and each of which do not require more internal memory resources than is available within the image processor.

Recall from the discussion of FIG. 1 that a DAG commences with the loading of input data from external memory into the line buffer unit(s) and closes with the writing of output data from the line buffer unit(s) into external memory. The initial DAG/pipeline 1608 of FIG. 16 therefore included commands/instructions to transfer input data from external memory into the line buffer unit(s) at the input to kernel K1 and also included commands/instructions to transfer output data from the line buffer unit(s) to external memory at the output of kernel K6.

After the compiler parses the original larger DAG/pipeline 1608 into smaller DAG/pipelines 1609, 1610, 1611, the compiler will additionally insert commands/instructions to load input data from external memory into the line buffer unit(s) at the inputs of kernels K2 and K4 (i.e., at the input of new smaller DAG/pipelines 1610 and 1611). The compiler will also insert commands/instructions to load output data from the line buffer unit(s) into external memory at the outputs of kernels K1 and K3 (i.e., at the output of new smaller DAG/pipelines 1609 and 1610). Note that where these insertions of new commands/instructions are located, the original DAG/pipeline 1608 specified the writing/reading of data to/from a line buffer unit rather than external memory (because kernels within a same DAG/pipeline feed/source one another through the line buffer units). As such these original commands/instructions will be removed by the compiler.

Note that various ones of the restructurings described may ultimately be performed in response to any of the inefficiencies discussed above. For instance, after a series of fusions the compiler may ultimately perform graph splitting.

In the aforementioned discussions note that kernels themselves may be large complex software routines composed of many branches and associated basic blocks of code when ultimately compiled into object code. As such, the subgraphs within the kernels may also themselves be composed of multiple branches and basic blocks of object code when ultimately compiled into object code.

FIG. 17*a* shows a method performed, e.g., by a compiler, as discussed above. As observed in FIG. 17*a* the method includes 1701 compiling program code targeted for an image processor having programmable stencil processors composed of respective two-dimensional execution lane and shift register circuit structures, the program code to implement a directed acyclic graph and being composed of multiple kernels that are to execute on respective ones of said stencil processors, wherein the compiling comprises any of: recognizing there are a different number of kernels in the program code than stencil processors in the image processor; recognizing that at least one of the kernels is more computationally intensive than another one of the kernels; recognizing that the program code has resource requirements that exceed the image processor's memory capacity. The method also includes 1702 in response to any of the aforementioned recognizing performing any of: horizontal fusion of kernels; vertical fusion of kernels; fission of one of the kernels into multiple kernels; spatial partitioning of a kernel into multiple spatially partitioned kernels; splitting the directed acyclic graph into smaller graphs.

FIG. 17*b* depicts an application software development and simulation environment 1721 that may be used with any of the aforementioned compiler processes when compiling program code for execution on an image processor such as an image processor having any of the hardware features discussed above. Here, a developer may develop a comprehensive image processing function (e.g., an image processing pipeline where each stage in the pipeline performs a dedicated image processing task, some other DAG prescribed set of routines, etc.) by arranging kernels in a strategic sequence that is consistent with the overall intended image transformation. Kernels may be called up from a library 1722 and/or the developer may develop one or more custom kernels.

Kernels within the library 1722 may be provided by a third party vendor of kernels and/or a provider of any underlying technology (e.g., a vendor of a hardware platform that includes the targeted hardware image processor or a vendor of the targeted hardware image processor (e.g., provided as a design thereof or as actual hardware)).

In the case of custom developed kernels, in many situations the developer need only write the program code for a single thread 1723. That is, the developer need only write program code that determines a single output pixel value by referencing input pixel values relative to the output pixel location (e.g., with the aforementioned position relative memory access instruction format). Upon satisfaction of the operation of the single thread 1723, the development environment may then automatically instantiate multiple instances of the thread code on a respective virtual processor to effect a kernel on an array of processors that operate on an image surface area. The image surface area may be a section of an image frame (such as a line group).

In various embodiments, the custom thread program code is written in the object code of the virtual processor ISA (or a higher level language that is compiled down to the virtual processor ISA object code). Simulation of execution of the custom kernel's program code may be performed in a simulated runtime environment that includes a virtual processor accessing a memory organized according to the memory model. Here, software models (object oriented or otherwise) of a virtual processor 1724 and a memory 1725 that incorporates the model are instantiated.

The virtual processor model 1724 then simulates execution of the thread code 1723. Upon satisfaction of the performance of a thread, its larger kernel and any larger function that the kernel belongs to, the whole is compiled into the actual object code of the underlying hardware. The entirety of the simulation environment 1721 may be implemented as software that runs on a computer system (e.g., a workstation) 1726.

f. Implementation Embodiments

It is pertinent to point out that the various image processor architecture features described above are not necessarily limited to image processing in the traditional sense and therefore may be applied to other applications that may (or may not) cause the image processor to be re-characterized. For example, if any of the various image processor architecture features described above were to be used in the creation and/or generation and/or rendering of animation as opposed to the processing of actual camera images, the image processor may be characterized as a graphics processing unit. Additionally, the image processor architectural features described above may be applied to other technical applications such as video processing, vision processing, image recognition and/or machine learning. Applied in this manner, the image processor may be integrated with (e.g., as a co-processor to) a more general purpose processor (e.g., that is or is part of a CPU of computing system), or, may be a stand alone processor within a computing system.

The hardware design embodiments discussed above may be embodied within a semiconductor chip and/or as a description of a circuit design for eventual targeting toward a semiconductor manufacturing process. In the case of the later, such circuit descriptions may take of the form of a (e.g., VHDL or Verilog) register transfer level (RTL) circuit description, a gate level circuit description, a transistor level circuit description or mask description or various combinations thereof. Circuit descriptions are typically embodied on a computer readable storage medium (such as a CD-ROM or other type of storage technology).

From the preceding sections is pertinent to recognize that an image processor as described above may be embodied in hardware on a computer system (e.g., as part of a handheld device's System on Chip (SOC) that processes data from the handheld device's camera). In cases where the image processor is embodied as a hardware circuit, note that the image data that is processed by the image processor may be received directly from a camera. Here, the image processor may be part of a discrete camera, or, part of a computing system having an integrated camera. In the case of the later the image data may be received directly from the camera or from the computing system's system memory (e.g., the camera sends its image data to system memory rather than the image processor). Note also that many of the features described in the preceding sections may be applicable to a graphics processor unit (which renders animation).

FIG. 18 provides an exemplary depiction of a computing system. Many of the components of the computing system described below are applicable to a computing system having an integrated camera and associated image processor (e.g., a handheld device such as a smartphone or tablet computer). Those of ordinary skill will be able to easily delineate between the two. Additionally, the computing system of FIG. 18 also includes many features of a high performance computing system, such as a workstation used to implement the development environment discussed above with respect to FIG. 17c.

As observed in FIG. 18, the basic computing system may include a central processing unit 1801 (which may include, e.g., a plurality of general purpose processing cores 1815_1 through 1215_N and a main memory controller 1817 disposed on a multi-core processor or applications processor), system memory 1802, a display 1803 (e.g., touchscreen, flat-panel), a local wired point-to-point link (e.g., USB) interface 1804, various network I/O functions 1805 (such as an Ethernet interface and/or cellular modem subsystem), a wireless local area network (e.g., WiFi) interface 1806, a wireless point-to-point link (e.g., Bluetooth) interface 1807 and a Global Positioning System interface 1808, various sensors 1209_1 through 1809_N, one or more cameras 1810, a battery 1811, a power management control unit 1812, a speaker and microphone 1813 and an audio coder/decoder 1814.

An applications processor or multi-core processor 1850 may include one or more general purpose processing cores 1815 within its CPU 1201, one or more graphical processing units 1816, a memory management function 1817 (e.g., a memory controller), an I/O control function 1818 and an image processing unit 1819. The general purpose processing cores 1815 typically execute the operating system and application software of the computing system. The graphics processing units 1816 typically execute graphics intensive functions to, e.g., generate graphics information that is presented on the display 1803. The memory control function 1817 interfaces with the system memory 1802 to write/read data to/from system memory 1802. The power management control unit 1812 generally controls the power consumption of the system 1800.

The image processing unit 1819 may be implemented according to any of the image processing unit embodiments described at length above in the preceding sections. Alternatively or in combination, the IPU 1819 may be coupled to either or both of the GPU 1816 and CPU 1801 as a co-processor thereof. Additionally, in various embodiments, the GPU 1816 may be implemented with any of the image processor features described at length above.

Each of the touchscreen display 1803, the communication interfaces 1804-1807, the GPS interface 1808, the sensors 1809, the camera 1810, and the speaker/microphone codec 1813, 1814 all can be viewed as various forms of I/O (input and/or output) relative to the overall computing system including, where appropriate, an integrated peripheral device as well (e.g., the one or more cameras 1810). Depending on implementation, various ones of these I/O components may be integrated on the applications processor/multi-core processor 1850 or may be located off the die or outside the package of the applications processor/multi-core processor 1850.

In an embodiment one or more cameras 1810 includes a depth camera capable of measuring depth between the camera and an object in its field of view. Application software, operating system software, device driver software and/or firmware executing on a general purpose CPU core (or other functional block having an instruction execution pipeline to execute program code) of an applications processor or other processor may perform any of the functions described above.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired and/or programmable logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. One or more non-transitory computer storage media encoded with computer program instructions that when executed by one or more computers cause the one or more computers to perform operations comprising:
receiving instructions that define an original processing pipeline for a plurality of processors of a computing device, the original processing pipeline comprising a plurality of kernels to be executed in a particular order, each kernel comprising respective instructions to be performed by one of the plurality of processors, wherein the original processing pipeline specifies which of the kernels generate output to be used as input to one or more other kernels in the original processing pipeline;
determining that the original processing pipeline comprises two independent kernels that have a consumer-producer relationship and that one or more vertical fusion criteria are satisfied, wherein the two independent kernels comprise load instructions that read from different respective line buffers of the computing device; and
in response, generating a modified processing pipeline including generating instructions of a vertically fused kernel having instructions from both of the two independent kernels, and including modifying a respective line buffer reference by one or more load instructions from the two independent kernels so that all load instructions of the vertically fused kernel read from a same line buffer, wherein instructions of the original processing pipeline cause a producer kernel of the two independent kernels to write output to a particular line buffer and cause a consumer kernel of the two independent kernels to read the output from the particular line buffer, and wherein the instructions of the vertically fused kernel cause the output of the producer kernel to be stored in memory local to a processor in the plurality of processors and cause the vertically fused kernel to read the output stored in the memory local to the processor.

2. The one or more computer storage media of claim 1, wherein determining that the one or more vertical fusion criteria are satisfied comprises:

(i) determining that a measure of complexity of the two kernels satisfies a threshold, (ii) determining that the original processing pipeline has more kernels than processors of the computing device, or both (i) and (ii).

3. The one or more computer storage media of claim 1, wherein generating the modified processing pipeline further comprises modifying one or more store instructions from the two independent kernels so that all store instructions of the vertically fused kernel write to the same line buffer.

4. A computer-implemented method comprising:

receiving instructions that define an original processing pipeline for a plurality of processors of a computing device, the original processing pipeline comprising a plurality of kernels to be executed in a particular order, each kernel comprising respective instructions to be performed by one of the plurality of processors, wherein the original processing pipeline specifies which of the kernels generate output to be used as input to one or more other kernels in the original processing pipeline;

determining that the original processing pipeline comprises two independent kernels that have a consumer-producer relationship and that one or more vertical fusion criteria are satisfied, wherein the two independent kernels comprise load instructions that read from different respective line buffers of the computing device; and in response, generating a modified processing pipeline including generating instructions of a vertically fused kernel having instructions from both of the two independent kernels, and including modifying a respective line buffer reference by one or more load instructions from the two independent kernels so that all load instructions of the vertically fused kernel read from a same line buffer, wherein instructions of the original processing pipeline cause a producer kernel of the two independent kernels to write output to a particular line buffer and cause a consumer kernel of the two independent kernels to read the output from the particular line buffer, and wherein the instructions of the vertically fused kernel cause the output of the producer kernel to be stored in memory local to a processor in the plurality of processors and cause the vertically fused kernel to read the output stored in the memory local to the processor.

5. The method of claim 4, wherein determining that the one or more vertical fusion criteria are satisfied comprises:

(i) determining that a measure of complexity of the two kernels satisfies a threshold, (ii) determining that the original processing pipeline has more kernels than processors of the computing device, or both (i) and (ii).

6. The method of claim 4, wherein generating the modified processing pipeline further comprises modifying one or more store instructions from the two independent kernels so that all store instructions of the vertically fused kernel write to the same line buffer.

7. A system comprising:

one or more computers and one or more storage devices storing instructions that are operable, when executed by the one or more computers, to cause the one or more computers to perform operations comprising:

receiving instructions that define an original processing pipeline for a plurality of processors of a computing device, the original processing pipeline comprising a plurality of kernels to be executed in a particular order, each kernel comprising respective instructions to be performed by one of the plurality of processors, wherein the original processing pipeline specifies which of the kernels generate output to be used as input to one or more other kernels in the original processing pipeline;

determining that the original processing pipeline comprises two independent kernels that have a consumer-producer relationship and that one or more vertical fusion criteria are satisfied, wherein the two independent kernels comprise load instructions that read from different respective line buffers of the computing device; and in response, generating a modified processing pipeline including generating instructions of a vertically fused kernel having instructions from both of the two independent kernels, and including modifying a respective line buffer reference by one or more load instructions from the two independent kernels so that all load instructions of the vertically fused kernel read from a same line buffer, wherein instructions of the original processing pipeline cause a producer kernel of the two independent kernels to write output to a particular line buffer and cause a consumer kernel of the two independent kernels to read the output from the particular line buffer, and wherein the instructions of the vertically fused kernel cause the output of the producer kernel to be stored in memory local to a processor in the plurality of processors and cause the vertically fused kernel to read the output stored in the memory local to the processor.

8. The system of claim 7, wherein determining that the one or more vertical fusion criteria are satisfied comprises:

(i) determining that a measure of complexity of the two kernels satisfies a threshold, (ii) determining that the original processing pipeline has more kernels than processors of the computing device, or both (i) and (ii).

9. The system of claim 7, wherein generating the modified processing pipeline further comprises modifying one or more store instructions from the two independent kernels so that all store instructions of the vertically fused kernel write to the same line buffer.

* * * * *